(12) United States Patent
Michiyama

(10) Patent No.: US 8,376,328 B2
(45) Date of Patent: Feb. 19, 2013

(54) FLUID FILLED TYPE VIBRATION DAMPING DEVICE

(75) Inventor: Wakako Michiyama, Owariasahi (JP)

(73) Assignee: Tokai Rubber Industries, Ltd., Aichi (JP)

( * ) Notice: Subject to any disclaimer, the term of this patent is extended or adjusted under 35 U.S.C. 154(b) by 872 days.

(21) Appl. No.: 12/292,841

(22) Filed: Nov. 26, 2008

(65) Prior Publication Data

US 2009/0140477 A1    Jun. 4, 2009

(30) Foreign Application Priority Data

Nov. 30, 2007  (JP) .................................. 2007-311729

(51) Int. Cl.
*F16F 5/00* (2006.01)
*F16F 9/516* (2006.01)
*F16F 9/14* (2006.01)

(52) U.S. Cl. .................................................. 267/140.13

(58) Field of Classification Search .................. 267/121, 267/140.11–140.15, 141.1
See application file for complete search history.

(56) References Cited

U.S. PATENT DOCUMENTS

| | | | |
|---|---|---|---|
| 4,781,362 A | 11/1988 | Reuter et al. | |
| 7,306,210 B2 | 12/2007 | Happou et al. | |
| 2006/0157902 A1 * | 7/2006 | Sakata | 267/140.13 |
| 2006/0208405 A1 * | 9/2006 | Muramatsu et al. | 267/140.11 |
| 2006/0249891 A1 * | 11/2006 | Ueki et al. | 267/140.13 |

FOREIGN PATENT DOCUMENTS

| | | |
|---|---|---|
| JP | A-8-28623 | 2/1996 |
| JP | 2005233243 A * | 9/2005 |
| JP | 2007120563 A * | 5/2007 |

OTHER PUBLICATIONS

Machine Translation of JP 2005233243 A.*

* cited by examiner

*Primary Examiner* — Robert A Siconolfi
*Assistant Examiner* — Anna Momper
(74) *Attorney, Agent, or Firm* — Oliff & Berridge, PLC

(57) ABSTRACT

A fluid filled type vibration damping device including: a partition member having a communication passage connecting a pressure receiving and equilibrium chambers; an obstructing rubber elastic plate juxtaposed against the communication passage from an equilibrium chamber side, adapted to obstruct the communication passage, and arranged to be exposed to pressure of the pressure receiving and the equilibrium chamber at both faces; and a constraining member provided for retaining an outer peripheral section of the obstructing rubber elastic plate in contact against the partition member at multiple locations. The constraining member provides an opening/closing control member operated to induce the obstructing rubber elastic plate to push against the partition member and close off the communication passage, and to induce elastic deformation of the obstructing rubber elastic plate to be separated from the partition member.

3 Claims, 20 Drawing Sheets

FLUID FILLED TYPE VIBRATION DAMPING DEVICE

INCORPORATED BY REFERENCE

The disclosure of Japanese Patent Application No. 2007-311729 filed on Nov. 30, 2007 including the specification, drawings and abstract is incorporated herein by reference in its entirety.

BACKGROUND OF THE INVENTION

1. Field of the Invention

The present invention relates to a vibration damping device adapted for installation between components to be provided with vibration damped linkage, and particularly to a fluid filled type vibration damping device that utilizes vibration damping action based on the flow action of a sealed therein.

2. Description of the Related Art

In the field of vibration damping devices such as vibration damping linkages or vibration damping supports designed for installation between components that make up a vibration transmission system, one type of known device is a fluid filled type vibration damping device that utilize vibration damping action based on the flow action of a fluid sealed inside. Such a fluid filled type vibration damping device has a first mounting member and a second mounting member linked by a rubber elastic body. To the inner peripheral side of the second mounting member, there is defined a pressure receiving chamber whose wall is partially constituted by the main rubber elastic body, and an equilibrium chamber whose wall is constituted by a flexible film. The chambers are filled with a non-compressible fluid, and the pressure receiving chamber and the equilibrium chamber communicate with each other through an orifice passage.

Based on the flow action of a fluid induced to flow between the pressure receiving chamber and the equilibrium chamber through the orifice passage, excellent vibration damping action can be produced against vibration in a specific targeted frequency range. The application of such fluid filled type vibration damping devices in automotive engine mounts, body mounts, and suspension mounts for example, is a topic of ongoing research. Japanese unexamined Patent Publication No. JP-A-8-28623 shows one example of a fluid filled type vibration damping device.

The known fluid filled type vibration damping devices are designed to exhibit vibration damping effect based on the flow action of a fluid against vibration in a narrow frequency range to which the orifice passage has been tuned. Therefore, they may suffer from a problem that effective vibration damping action will not be attained against vibration to be damped depending on errors in frequency of vibration to be damped, and individual difference in tuning of orifice passages due to manufacturing errors, dimensional errors, material errors and so forth of the fluid filled type vibration damping devices.

In recent years, one improvement of vibration damping ability is desired in order to exhibit higher attenuating action in a specific narrow frequency band, whereas there is increasingly higher requirements for another improvement of vibration damping ability in order to exhibit effective vibration damping action stably against vibration over a wider frequency range. That is, there exists a need for broadening vibration damping characteristics for effective attenuating action based on the flow action of the fluid through the orifice passage against vibration over a wider frequency range and stably exhibiting excellent vibration damping ability of fluid filled type vibration damping devices.

However, it is difficult for fluid filled type vibration damping devices of known construction to exhibit vibration damping effect based on the flow action of the fluid through the orifice passage over a wide frequency range, although they are able to adjust tuning frequency by means of appropriately setting the ratio of passage length and passage cross sectional area of the orifice passages etc. In particular, the fluid filled type vibration damping devices of simple construction without outside control mechanism such as electromagnetic oscillation members have not yet been realized the art that attains both effective vibration damping effect and effective wide frequency range at the same time.

SUMMARY OF THE INVENTION

It is therefore one object of this invention to provide a fluid filled type vibration damping device of novel construction, that is able to effectively exhibit vibration damping effect based on the flow action of the fluid through the orifice passage against vibration over a wider frequency range and is realized by a simple construction.

The above and/or optional objects of this invention may be attained according to at least one of the following modes of the invention. The following modes and/or elements employed in each mode of the invention may be adopted at any possible optional combinations. It is to be understood that the principle of the invention is not limited to these modes of the invention and combinations of the technical features, but may otherwise be recognized based on the teachings of the present invention disclosed in the entire specification and drawings or that may be recognized by those skilled in the art in the light of the present disclosure in its entirety.

A principle of the present invention provides a fluid filled type vibration damping device comprising: a rubber elastic body elastically connecting a first mounting member and a second mounting member; a partition member supported on the second mounting member; a pressure receiving chamber whose wall is partly defined by the rubber elastic body; an equilibrium chamber whose wall is partly defined by a flexible film; the pressure receiving chamber and the equilibrium chamber being filled with a non-compressible fluid, and the pressure receiving chamber and the equilibrium chamber communicating with each other through an orifice passage, a partition member that partitions the pressure receiving chamber and the equilibrium chamber being provided with a communication passage that connects the pressure receiving chamber and the equilibrium chamber; an obstructing rubber elastic plate being juxtaposed against the communication passage from an equilibrium chamber side, being adapted to obstruct the communication passage, and being arranged such that pressure of the pressure receiving chamber acts upon a first face of the obstructing rubber elastic plate while pressure of the equilibrium chamber acts on another face thereof; and a constraining member being provided for retaining an outer peripheral section of the obstructing rubber elastic plate in a state of localized contact against the partition member at multiple locations on a circumference, wherein the constraining member provides an opening/closing control member such that positive pressure of the pressure receiving chamber acting on the obstructing rubber elastic plate induces zones situated in an outer peripheral section of the obstructing rubber elastic plate but away from retained sections by the constraining member to undergo elastic deformation in a direction of separation from the partition member, and open up the communication passage.

In the fluid filled type vibration damping device of construction according to the present invention, when positive pressure arises in the pressure receiving chamber, the obstructing rubber elastic plate will undergo elastic deformation under the action of the positive pressure of the pressure receiving chamber, causing the communication passage to open up. The sealed fluid will thereby be caused to flow between the pressure receiving chamber and the equilibrium chamber through the communication passage which has lower flow resistance than the orifice passage so that wall spring rigidity of the pressure receiving chamber will become lower. Accordingly, the tuning frequency of the orifice passage shifts further towards the low-frequency end than the original tuning frequency, whereby excellent vibration damping effect can be obtained against vibration in the lower frequency range than the original tuning frequency of the orifice passage as well. Consequently, in the fluid filled type vibration damping device of construction according to the present invention, it is possible to exhibit excellent vibration damping effect based on the flow action of the fluid through the orifice passage against vibration over a wider frequency range.

Besides, the present invention realizes the adjustment of the tuning of the orifice passage by utilizing pressure fluctuations of the pressure receiving chamber induced by vibration input. Thus, it is possible to realize broadening vibration damping characteristics through an extremely simple and inexpensive construction without a special need for exerting air pressure or energizing from an outside.

In another possible mode of the fluid filled type vibration damping device according to the invention, the obstructing rubber elastic plate is fastened at the center section thereof to the partition member.

Fastening the center section of the obstructing rubber elastic plate to the partition member in this way has the effect of limiting elastic deformation of the center section of the obstructing rubber elastic plate, thus preventing excessive absorption of internal pressure of the pressure receiving chamber by deformation of the obstructing rubber elastic plate.

In yet another possible mode of the fluid filled type vibration damping device according to the invention, the obstructing rubber elastic plate is furnished with a reinforcing member having a plurality of spoke-shaped portions that extend radially towards the outer peripheral section from the center section; and the constraining member includes the reinforcing member.

By furnishing the obstructing rubber elastic plate with such a reinforcing member having a plurality of spoke-shaped portions that extend radially towards the outer peripheral section from the center section, there can be constituted the constraining member whereby the outer peripheral section of the obstructing rubber elastic plate will be retained in a state of contact against the partition member at multiple locations on the circumference. With this arrangement, when large-amplitude vibration of lower frequency than the tuning frequency is input to the pressure receiving chamber, zones situated in the outer peripheral section of the obstructing rubber elastic plate but away from sections where the reinforcing member is attached will undergo elastic deformation, and the pressure receiving chamber and the equilibrium chamber communicate with each other through the communication passage. Escape of internal pressure of the pressure receiving chamber to the equilibrium chamber through the communication passage causes the substantial wall spring rigidity of the pressure receiving chamber to become lower, whereby resonance frequency of the fluid induced to flow through the orifice passage, namely, the tuning frequency of the orifice passage shifts further towards the low-frequency end. Consequently, the intended vibration damping action can be achieved against input of vibration in a wider frequency range that includes vibration of lower frequency than the original tuning frequency of the orifice passage.

In particular, by providing the obstructing rubber elastic plate with a plurality of radially-extending spoke-shaped portions, elastic deformation of the obstructing rubber elastic plate is effectively limited. Accordingly, internal pressure of the pressure receiving chamber will be sufficiently ensured, whereby vibration damping effect based on the flow action of the fluid through the orifice passage can be effectively achieved.

Besides, the spoke-shaped portions extending radially make it possible to adjust aperture area of the communication passage depending on the input vibration. In other words, since the spoke-shaped portions extend radially, the zones situated between the spoke-shaped portions have progressively smaller effective free length in the circumferential direction moving towards the center in the diametrical direction, and become progressively more resistant to deformation moving towards the center. Thus, in instances where large positive pressure acts on the pressure receiving chamber, the communication passage can be prevented from opening any more than necessary; and as the level of positive pressure acting on the pressure receiving chamber increases, the zones situated away from sections where the reinforcing member is attached will experience progressive elastic deformation towards the inner peripheral side, thus ensuring that the aperture area of the communication passage will not exceed that needed to adjust the tuning of the orifice passage. Consequently, it is possible to effectively attain tuning adjustment effect of the orifice passage owing to escape of internal pressure of the pressure receiving chamber, while at the same time preventing escape of internal pressure of the pressure receiving chamber any more than necessary, so that vibration damping effect based on fluid flow through the orifice passage is effectively achieved.

In a preferred mode of the fluid filled type vibration damping device according to the invention, where an obstructing rubber elastic plate provided with a reinforcing member having the spoke-shaped portions as described above is employed, the reinforcing member preferably has a construction wherein split rim portions that extend in the circumferential direction of the obstructing rubber elastic plate are integrally provided at the outside peripheral distal end sections of the spoke-shaped portions.

By employing such a reinforcing member that is provided with split rim portions at the outside peripheral distal end sections of the spoke-shaped portions, the sections in the outside peripheral edge part of the obstructing rubber elastic plate which have been provided with the split rim portions can be held securely in contact against the partition member. Thus, the communication passage can more advantageously be maintained in the closed state at times of input of vibration, making it possible to ensure that a large amount of fluid flows through the orifice passage. Consequently, the desired vibration damping effect of the vibration damping device can be effectively achieved.

Moreover, since the split rim portions are provided at the outside peripheral distal end sections of the spoke-shaped portions, it will be possible to attain a sufficient level of retention force in the outside peripheral edge part of the obstructing rubber elastic plate, while at the same time ensuring large effective free length of zones situated in a diametrically medial section of the obstructing rubber elastic plate but away from sections constrained by the reinforcing member. Consequently, miniscule elastic deformation of the obstructing rubber elastic plate in the aforementioned zone will be advantageously allowed, thereby effectively producing action of absorbing pressure in the pressure receiving chamber. Thus, vibration damping effect against input of, for example, high-frequency, small-amplitude vibration owing to low dynamic spring behavior can be improved.

Namely, since the split rim portions are provided extending in the circumferential direction from the outside peripheral distal end sections of the spoke-shaped portions, it is possible to attain a large area of retained sections in the outside peripheral edge part of the obstructing rubber elastic plate (the sections where the reinforcing member is provided) without changing the circumferential width dimension of the spoke-shaped portions. As a result, it is possible to ensure a sufficient retention force for maintaining the obstructing rubber elastic plate in a state of contact against the partition member, while at the same time ensuring large effective free length of zones situated further inward from the split rim portions of the obstructing rubber elastic plate but away from sections where the reinforcing member is provided, thereby effectively producing elastic deformation of the aforementioned zones.

In another possible mode of the fluid filled type vibration damping device according to the invention, where a construction having a reinforcing member is employed, the reinforcing member may be composed of a plate spring, with the plate spring partially fastened to the partition member.

Where the reinforcing member is composed of a plate spring, excessive deformation of the obstructing rubber elastic plate will be more effectively prevented by the plate spring. Thus, pressure fluctuations of the pressure receiving chamber can be prevented from escaping to the equilibrium chamber any more than necessary, a sufficient flow of fluid through the orifice passage can be assured, and vibration damping effect based on flow action of fluid induced to flow through the orifice passage can be more effectively achieved. Consequently, the desired vibration damping action can be exhibited over a wider range of frequencies.

Furthermore, where the reinforcing member is composed of an elastically deformable plate spring, elastic deformation of the obstructing rubber elastic plate will be allowed in the section thereof where the reinforcing member is disposed. Thus, in the event that a very high level of positive pressure should act on the pressure receiving chamber, the section of the obstructing rubber elastic plate where the plate spring is attached will undergo elastic deformation, allowing the communication passage to open up with a larger aperture area. Consequently, tuning of the orifice passage can be adjusted with a higher degree of freedom, thereby achieving effective vibration damping action against vibration over a wider frequency range.

In another possible mode of the fluid filled type vibration damping device according to the invention, where a construction having a reinforcing member is employed, the reinforcing member may be a rigid body.

By making the reinforcing member a rigid body that experiences substantially no deformation, the level of deformation of the obstructing rubber elastic plate can be effectively limited. In particular, by preventing deformation of the obstructing rubber elastic plate in sections thereof where the spoke-shaped portions are disposed, the aperture area of the communication passage can be adjusted with higher accuracy utilizing the variation in diametrical direction of the distance separating the plurality of spoke-shaped portions in the circumferential direction, and hence of the effective free length of the obstructing rubber elastic plate in the circumferential direction.

In another possible mode of the fluid filled type vibration damping device according to the invention, the obstructing rubber elastic plate is retained by the constraining member at the retained sections in the outer peripheral section thereof, and the retained sections undergo elastic deformation in the direction of separation from the partition member through action of a positive pressure greater than a positive pressure of the pressure receiving chamber inducing elastic deformation in zones away from the retained sections, causing the communication passage to open up.

With such an arrangement, the opening/closing control member is operated in multiple stepwise fashion depending on the pressure of the pressure receiving chamber, whereby the level of liquid pressure of the pressure receiving chamber that will escape to the equilibrium chamber through the communication passage can be varied in stepwise or continuous fashion. Consequently, wall spring rigidity of the pressure receiving chamber can be adjusted in multiple stepwise fashion, thereby shifting the tuning frequency of the orifice passage depending on input vibration. Accordingly, the intended vibration damping action can be effectively achieved against input vibration over an even wider range of frequencies.

BRIEF DESCRIPTION OF THE DRAWINGS

The foregoing and/or other objects, features and advantages of the invention will become more apparent from the following description of a preferred embodiment with reference to the accompanying drawings in which like reference numerals designate like elements and wherein.

DETAILED DESCRIPTION OF PREFERRED EMBODIMENTS

Figure 1:
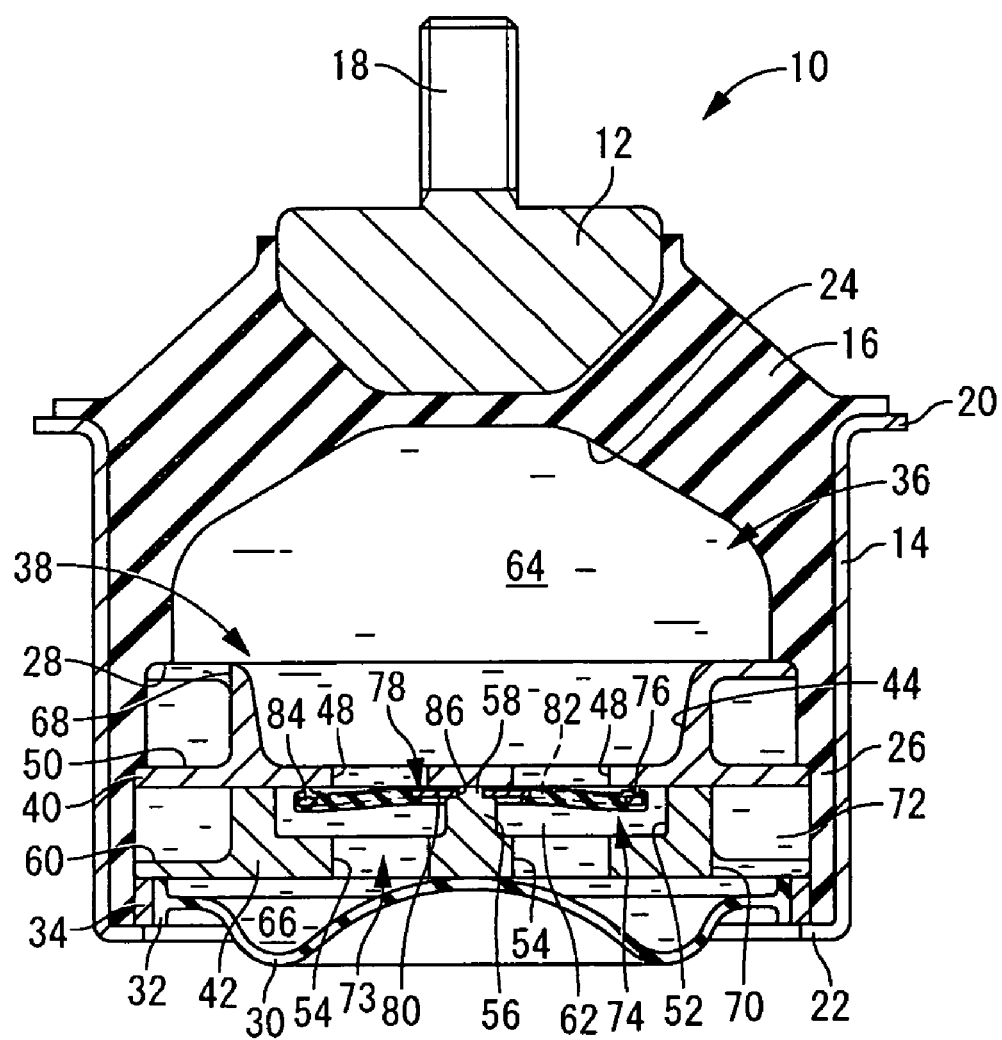
FIG. 1 is a fluid filled type vibration damping device in the form of an engine mount of construction according to a first embodiment of the present invention, taken along line 1-1 of FIG. 2.
Figure 2:
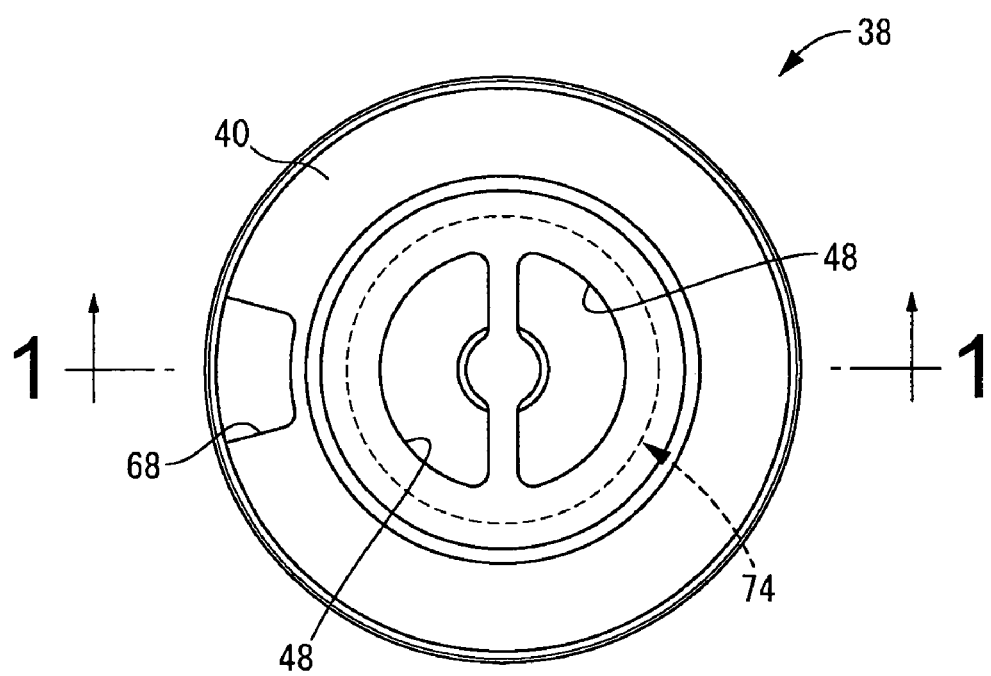
FIG. 2 is a top plane view of a partition member of the engine mount of FIG. 1.

Referring first to FIG. 1, there is depicted an automotive engine mount 10 as one embodiment of the fluid filled type vibration damping device according to the present invention. This engine mount 10 has a construction in which a first mounting member 12 of metal and a second mounting member 14 of metal are connected to one another by a main rubber elastic body 16. The first mounting member 12 is then mounted onto the power unit of the automobile, not shown, which is one of the components making up a vibration transmission system, while the second mounting member 14 is mounted onto the body of the automobile, not shown, which is the other component making up the vibration transmission system, thereby providing vibration damped linkage of the power unit and the car body via the engine mount 10. In the description hereinbelow, the vertical direction refers to the axial direction of the engine mount 10, and also to the vertical direction in FIG. 1, which is coincident with the direction of primary vibration input. In FIG. 1, the engine mount 10 is depicted prior to installation in a vehicle; through installation in a vehicle, the distributed support load of the power unit will be exerted in the axial direction of the engine mount 10.

To describe in greater detail, the first mounting member 12 is a rigid member formed from iron, aluminum alloy or the like, and has a round block shape. An upwardly projecting mounting bolt 18 is integrally formed at the upper end of the first mounting member 12. The first mounting member 12 is attached to the power unit (not shown) by screw fastening the mounting bolt 18 to the power unit.

The second mounting member 14 is a high-rigidity component made of material similar to the first mounting member 12, and has a thin, large-diameter, generally round tube shape. A flanged portion 20 is integrally formed at the upper end of the second mounting member 14, and a swaging piece 22 is formed at the lower end. The second mounting member 14 will be mounted onto the vehicle body side through the agency of a bracket fitting (not shown) or the like fastened about the outside.

The first mounting member 12 and the second mounting member 14 are arranged spaced apart on the same center axis, with the first mounting member 12 situated above the second mounting member 14, and with the fittings linked together by the main rubber elastic body 16.

The main rubber elastic body 16 is formed from a thick rubber elastic body having generally frustoconical shape, with a large-diameter recess 24 formed at its large-diameter end. The large-diameter recess 24 is a recess of inverted, generally bowl or semispherical shape opening downward. In the main rubber elastic body 16, the rim of the opening of the large-diameter recess 24 projects downward.

The first mounting member 12 is inserted from above and vulcanization bonded to the small-diameter end of the main rubber elastic body 16, while the inside peripheral face of the second mounting member 14 is vulcanization bonded to the outside peripheral face of the large-diameter end of the main rubber elastic body 16, whereby the first mounting member 12 and the second mounting member 14 are elastically linked through the main rubber elastic body 16. The main rubber elastic body 16 according to this embodiment is provided as an integrally vulcanization molded component that incorporates the first mounting member 12 and the second mounting member 14.

A seal rubber layer 26 is integrally formed with the main rubber elastic body 16. This seal rubber layer 26 is a rubber elastic body of thin-walled, large diameter, generally round tubular shape extending downward from the lower end of the main rubber elastic body 16, and is anchored to the inside peripheral face of the second mounting member 14. The seal rubber layer 26 is larger in inside diameter than the lower end of the main rubber elastic body 16, with a shoulder portion 28 having continuous annular contours in the circumferential direction formed in the boundary section between the main rubber elastic body 16 and the seal rubber layer 26. The seal rubber layer 26 in this embodiment is thinner to the lower side of its axially medial section than to the upper side, with a shoulder formed in the axially medial section of the seal rubber layer 26 on its inside peripheral face. The inside peripheral face of the second mounting member 14 is sheathed over substantially its entire axial length by the main rubber elastic body 16 and the seal rubber layer 26.

As the flexible film, a diaphragm 30 is disposed at the lower end of the second mounting member 14. The diaphragm 30 is a rubber film of thin, generally round disk shape or circular dome shape having ample slack in the axial direction. A fastener portion 32 of annular shape is integrally formed in the outside peripheral edge part of the diaphragm 30.

A fastener fitting 34 is juxtaposed against and fastened to the outside peripheral face of the fastener portion 32. The fastener fitting 34 is a fitting of generally annular shape, and is a rigid body formed of material similar to the first and second mounting members 12, 14. The fastener portion 32 which has been integrally formed with the diaphragm 30 is juxtaposed against and vulcanization bonded to the inside peripheral face of the fastener fitting 34. The diaphragm 30 in this embodiment is provided as an integrally vulcanization molded component that integrally incorporates the fastener fitting 34.

This diaphragm 30 is attached to the second mounting member 14. Specifically, the fastener fitting 34 which has been fastened about the outside peripheral edge of the diaphragm 30 is juxtaposed, via the intervening seal rubber layer 26, against the lower end of the second mounting member 14, and the second mounting member 14 is then subjected to a diameter reduction process such as 360-degree radial compression to fasten the fastener fitting 34 in a state of intimate contact against the second mounting member 14. In this embodiment, the lower end of the second mounting member 14 is bent peripherally inward to place it in abutment against the lower end face of the fastener fitting 34, thus preventing the fastener fitting 34 from becoming dislodged in the axial direction.

By thusly attaching the diaphragm 30 to the second mounting member 14, there will be defined between the axially opposed faces of the main rubber elastic body 16 and the diaphragm 30 to the inner peripheral side of the second mounting member 14 a fluid chamber 36 that is isolated from the outside and that is filled with a non-compressible fluid. While no particular limitation is imposed on the sealed non-compressible fluid filling the fluid chamber 36, it would be favorable to use water, an alkylene glycol, a polyalkylene glycol, a silicone oil, a some mixture of these for example. In order to effectively achieve vibration damping effect based on flow action of the fluid (discussed later) a low-viscosity fluid having viscosity of 0.1 Pa·s or lower is preferred.

Additionally, a partition member 38 is disposed housed within the fluid chamber 36. The partition member 38 in this embodiment includes an upper partition fitting 40 and a lower partition fitting 42. The upper partition fitting 40 is made of metal such as aluminum alloy, and has a generally round disk shape overall. A center recess 44 of circular shape opening upward is formed in the diametrical center section of the upper partition fitting 40.

As communication passages, upper communication windows 48 are formed in the base wall part of the center recess 44 of the upper partition fitting 40. The upper communication windows 48 are formed so as to pass through the base wall part of the center recess 44 in its medial section in the diametrical direction. In this embodiment, two such upper communication windows 48 having generally semicircular contours viewed in the axial direction are provided, situated in opposition a prescribed distance apart in the diametrical direction.

An upper circumferential groove 50 is formed on the outside peripheral edge of the upper partition fitting 40. The upper circumferential groove 50 is a slot that opens onto the outside peripheral face of the upper partition fitting 40, and that extends for a prescribed length short of full circle in the circumferential direction.

Meanwhile, the lower partition fitting 42, like the upper partition fitting 40, is made of metal such as aluminum alloy, and has a generally round disk shape overall. A housing recess 52 of circular shape opening upward is formed in the diametrical center section of the lower partition fitting 42.

Lower communication windows 54 are formed in the base wall part of the housing recess 52 of the lower partition fitting 42. The lower communication windows 54, like the upper communication windows 48 have generally semicircular contours viewed in the axial direction. Two such lower communication windows 54 are situated in opposition a prescribed distance apart in the diametrical direction.

A support projection 56 is integrally formed on the base wall part of the housing recess 52 of the lower partition fitting 42. The support projection 56 is of small-diameter, generally round post shape, and projects upward from the diametrical center of the lower partition fitting 42. An insert projection 58 is integrally formed at the distal end section of the support projection 56. The insert projection 58 is a round projection of smaller diameter than the support projection 56, and projects upward from the center section at the distal end of the support projection 56. It is sufficient for the support projection 56 and the insert projection 58 to have structure which is able to realize positioning and fastening the center section of the moveable rubber film 74, which will be described later, and no particular limitation is imposed as to the specific shape, size etc.

A lower notched portion 60 is formed at the outside peripheral edge of the lower partition fitting 42. The lower notched portion 60 opens onto the outside peripheral face and upper face of the lower partition fitting 42, and extends for a prescribed length short of full circle in the circumferential direction.

The upper partition fitting 40 and the lower partition fitting 42 having the construction described above are juxtaposed top to bottom along the same center axis. The upper partition fitting 40 and the lower partition fitting 42 are positioned in the circumferential direction with respect to one another so that the upper communication windows 48 and the lower communication windows 54 are positioned overlapping in axial projection view. Thus, the one end of the upper circumferential groove 50 and the one end of the lower notched portion 60 are positioned overlapping in axial projection view.

Also, with the upper partition fitting 40 and the lower partition fitting 42 assembling by being juxtaposed together, the upper face opening of the lower notched portion 60 that was formed in the lower partition fitting 42 will be covered by the outside peripheral edge part of the upper partition fitting 40, giving the lower notched portion 60 a grooved contour opening towards the outside peripheral side. Additionally, at an end of the mutually aligned upper circumferential groove 50 and lower notched portion 60, a connecting passage is formed in the lower face of the upper circumferential groove 50. The upper circumferential groove 50 and lower notched portion 60 are thereby connected in series to form a circumferential groove of helical shape that extends for a length short of twice around the circumferential direction.

Furthermore, by assembling together the upper partition fitting 40 and the lower partition fitting 42, the opening of the housing recess 52 that was formed in the center section of the lower partition fitting 42 will be covered by the base wall part of the center recess 44 that was formed in the upper partition fitting 40, thus defining a housing space 62 between the upper partition fitting 40 and the lower partition fitting 42.

The partition member 38 having the above construction will be positioned housed within the fluid chamber 36 as discussed above. Specifically, the partition member 38 will be inserted into the second mounting member 14 (to which the diaphragm 30 is not yet attached), by inserting it from the opening on the side opposite the opening to which the main rubber elastic body 16 was attached (the lower opening in FIG. 1). The diaphragm 30 will then be inserted into the second mounting member 14 from below the partition member 38. The second mounting member 14 will then be subjected to a diameter reduction process so that the partition member 38 and the diaphragm 30 are supported by the second mounting member 14.

With the partition member 38 thusly installed in the second mounting member 14, the outside peripheral face of the partition member 38 will be disposed in intimate contact against the second mounting member 14 via the intervening seal rubber layer 26, dividing the fluid chamber 36 into upper and lower parts to either side of the partition member 38. Specifically, to one side of the partition member 38 (the upper side in FIG. 1) there will be formed a pressure receiving chamber 64 whose wall is partly defined by the main rubber elastic body 16 and that gives rise to pressure fluctuations at times of input of vibration. Meanwhile, to the other side of the partition member 38 (the lower side in FIG. 1) there will be formed an equilibrium chamber 66 whose wall is partly defined by the diaphragm 30 and that is adapted to readily change volume. A non-compressible fluid fills the pressure receiving chamber 64 and the equilibrium chamber 66.

The outside peripheral opening of the circumferential groove that was formed on the outside peripheral edge of the partition member 38 is blocked off by the second mounting member 14 via the intervening seal rubber layer 26, forming a tunnel-like passage. At one circumferential end of tunnel-like passage there is formed an upper connecting passage 68 that passes through the upper wall and opens onto the upper face at the outside peripheral edge of the upper partition fitting 40. At the other circumferential end of tunnel-like passage there is formed a lower connecting passage 70 that passes through the lower wall and opens onto the lower face at the outside peripheral edge of the lower partition fitting 42. Thus, at the outside peripheral edge of the partition member 38 there will be formed an orifice passage 72 that extends in a helical shape for a prescribed distance and interconnects the pressure receiving chamber 64 and the equilibrium chamber 66.

In this embodiment, through appropriate setting of the passage length and passage cross sectional area of the orifice passage 72 with attention to the wall spring rigidity of the pressure receiving chamber 64, the passage will be tuned so as to exhibit vibration damping effect (based on flow action of the fluid) against vibration of about 10 Hz, corresponding to engine shake of an automobile.

In the diametrical center section of the partition member 38, the upper communication windows 48 that were formed in the upper partition fitting 40 are placed in communication with the pressure receiving chamber 64. The upper communication windows 48 are placed in communication with the equilibrium chamber 66 through the housing space 62 and the lower communication windows 54. The pressure receiving chamber 64 and the equilibrium chamber 66 thereby communicate with each other through the upper communication windows 48. In this embodiment, the upper communication windows 48, the housing space 62, and the lower communication windows 54 constitute a short-circuit passage 73 that interconnects the pressure receiving chamber 64 and the equilibrium chamber 66.

Figure 3:
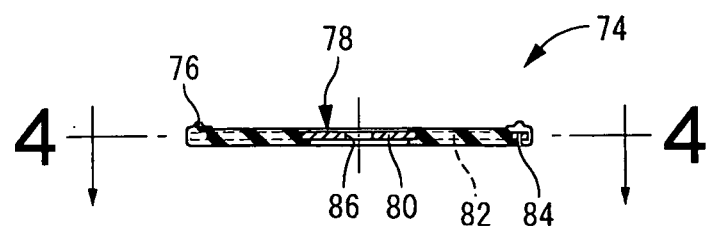
FIG. 3 is a moveable rubber film of the engine mount of FIG. 1, taken along line 3-3 of FIG. 4.
Figure 4:
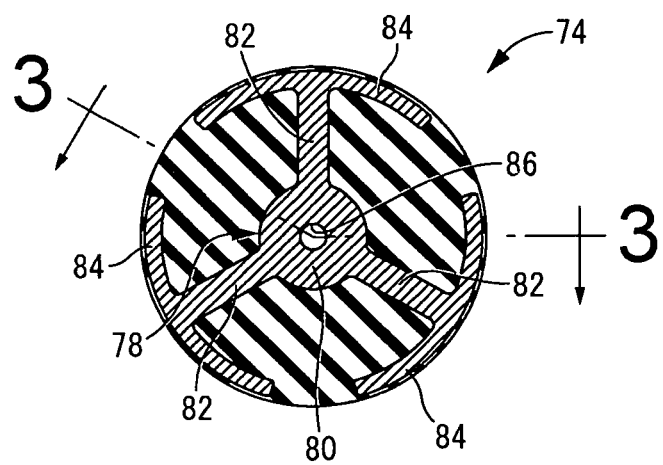
FIG. 4 is the moveable rubber film, taken along line 4-4 of FIG. 3.

As the obstructing rubber elastic plate, a moveable rubber film 74 is arranged in the housing space 62 that was formed in the center section of the partition member 38. As depicted in FIGS. 3 and 4, the moveable rubber film 74 is formed by a rubber elastic body having generally circular disk shape, with a contact projection 76 integrally formed so as to project upward at its outer peripheral section.

The moveable rubber film 74 is positioned accommodated at the diametrical center of the housing space 62, and is juxtaposed from the equilibrium chamber 66 side against the upper wall of the housing space 62 in which the upper communication windows 48 were formed. When thusly installed in the housing space 62, the outside peripheral edge of the moveable rubber film 74 will be positioned to the outside peripheral side of the upper communication windows 48 so that the upper communication windows 48 are covered and blocked off by the moveable rubber film 74.

Furthermore, with the moveable rubber film 74 thusly installed on the partition member 38, the liquid pressure of the pressure receiving chamber 64 will act upon one face of the moveable rubber film 74 through the upper communication windows 48, while the liquid pressure of the equilibrium chamber 66 will act upon the other face of the moveable rubber film 74 through the lower communication windows 54.

The moveable rubber film 74 of this embodiment also has a plate spring 78 as a reinforcing member. The plate spring 78 is a member of thin, generally plate shape made of a metal such as iron or of a hard synthetic resin. As depicted in FIG. 4, it includes a central constraining portion 80; spoke-shaped spring portions 82 as spoke-shaped portions; and split rim portions 84. The spring constant of the plate spring 78 has been set to a higher level than the rubber elastic body that forms the moveable rubber film 74, making it more resistant to deformation.

To describe in detail, as depicted in FIG. 4, the central constraining portion 80 has a small-diameter, generally circular disk shape, with a circular insertion hole 86 formed in its center section. This insertion hole 86 is of shape and size corresponding to the insert projection 58 that was provided to the lower partition fitting 42.

The spoke-shaped spring portions 82, which extend linearly towards the outside peripheral side, are integrally formed with the central constraining portion 80. As depicted in FIG. 4, the spoke-shaped spring portions 82 extend radially from the central constraining portion 80. In this embodiment, three spoke-shaped spring portions 82 are formed spaced apart at equidistant intervals from one another in the circumferential direction.

The split rim portions 84 are integrally formed at the distal ends of the spoke-shaped spring portions 82. As depicted in FIG. 4, the split rim portions 84 are of curving elongated shape extending a prescribed distance in the circumferential direction. In this embodiment, the split rim portions 84 are respectively disposed at the distal ends of the spoke-shaped spring portions 82, and positioned spaced apart a prescribed distance from one another in the circumferential direction.

The plate spring 78 of construction as described above is attached to the rubber elastic body of the moveable rubber film 74. Specifically, the plate spring 78 is attached with its diametrical center section exposed to the outside from the rubber elastic body of the moveable rubber film 74, and with its outer peripheral section inclusive of the spoke-shaped spring portions 82 and the split rim portions 84 embedded in the interior of the rubber elastic body of the moveable rubber film 74. In other words, the outside peripheral edge of the central constraining portion 80, the spoke-shaped spring portions 82, and the split rim portions 84 are each attached embedded in the interior of the rubber elastic body that constitutes the moveable rubber film 74, while the center section of the central constraining portion 80 is exposed to the outside through the circular hole which has been formed in the center section of the rubber elastic body. In this embodiment, the moveable rubber film 74 is provided as an integrally vulcanization molded component that incorporates the plate spring 78.

Here, when the moveable rubber film 74 that incorporates the plate spring 78 is positioned at the diametrical center within the housing space 62, the central constraining portion 80 constituting the center section of the moveable rubber film 74 will be positioned between the opposed pair of upper communication windows 48. The center section of the central constraining portion 80 which lies exposed to the outside will be retained clasped between the support projection 56 and the upper wall face of the housing space 62, and the insert projection 58 that was integrally formed at the distal end of support projection 56 will fit inserted within the insertion hole 86 that perforates the center of the central constraining portion 80. In this embodiment, the plate spring 78 is fastened to the partition member 38 at the diametrical center section of the moveable rubber film 74 in this way.

Furthermore, in this embodiment, an upwardly projecting contact projection 76 is integrally formed on the moveable rubber film 74, in the section thereof that is situated to the outside peripheral side of the upper communication windows 48. For this reason, when the diametrical center section of the moveable rubber film 74 is clasped between the support projection 56 and the upper wall of the housing space 62, the center section of the moveable rubber film 74 will be pushed upward by the support projection 56 by a distance equivalent to the height of the contact projection 76. Thus, urging force directed axially upward based on the elastic force of the plate spring 78 will act on the moveable rubber film 74 on the section thereof to which the plate spring 78 is attached, thus serving to push the section of the moveable rubber film 74 in which the plate spring 78 is attached against the upper wall of the housing space 62.

In this way, the constraining member in this embodiment is realized by utilizing the urging force of the plate spring 78. In the stationary state in the absence of any external load, the outer peripheral section of the moveable rubber film 74 will be retained in the partition member 38 at multiple locations on its circumference to which the split rim portions 84 have been vulcanization bonded.

In this embodiment, in the stationary state in the absence of any external load, zones of the outer peripheral section of the moveable rubber film 74 that are situated away from sections in which the split rim portions 84 are attached will be held in a state of contact against the partition member 38 on the basis of the elastic force of the rubber elastic body which constitutes the moveable rubber film 74.

Furthermore, with the moveable rubber film 74 attached to the partition member 38, the elastic force of the plate spring 78 will be set at a higher level than the elastic force of the rubber elastic body which constitutes the moveable rubber film 74, and the urging force acting on the outer peripheral section of the moveable rubber film 74 in the retained sections to which the plate spring 78 is anchored will be set at a higher level than the urging force acting on zones away from the retained sections. Thus, the retained sections to which the plate spring 78 is anchored in the outer peripheral section of the moveable rubber film 74 will be pushed more strongly against the partition member 38 than are zones away from the retained sections.

With the automotive engine mount 10 constructed as above installed in an automobile, when engine shake or other vibration in the low-frequency range that can be a problem during driving is input, relatively large pressure fluctuations will be produced in the pressure receiving chamber 64. Due to a relative pressure fluctuation differential arising between the pressure receiving chamber 64 and the equilibrium chamber 66, sufficient flow of fluid through the orifice passage 72 will be effectively assured and effective vibration damping action (high damping action) against engine shake or other vibration of a low frequency range will be produced based on flow action, e.g. the resonance action, of the fluid.

Furthermore, at times of input of ordinary vibration, the moveable rubber film 74 remains pushed against the upper partition fitting 40 by retention force such that the moveable rubber film 74 and the upper partition fitting 40 will not be released from their state of contact. Thus, at times of input of ordinary vibration, the liquid pressure of the pressure receiving chamber 64 will be prevented from escaping to the equilibrium chamber 66 through the short-circuit passage 73, and vibration damping action based on fluid flow through the orifice passage 72 can be effectively achieved.

Moreover, in this embodiment, the plate spring 78 is attached to the moveable rubber film 74, and the plate spring 78 includes spoke-shaped spring portions 82 that extend radially. Thus, the free length of the rubber-only section (which to deform relatively easily) in the moveable rubber film 74 can be kept to a minimum, and liquid pressure absorbing action produced by elastic deformation of the moveable rubber film 74 can be limited. Pressure fluctuations of the pressure receiving chamber 64 can thus be assured, and the desired vibration damping action can be obtained.

Moreover, with the automotive engine mount 10 installed in an automobile, when idling vibration, driving rumble, or other such vibration in a medium- to high-frequency range is input, the orifice passage 72 will become substantially closed off through antiresonance-like action, and zones away from the section where the plate spring 78 is attached to the moveable rubber film 74 will experience miniscule deformation due to the relative pressure fluctuation differential arising between the pressure receiving chamber 64 and the equilibrium chamber 66 so that liquid pressure of the pressure receiving chamber 64 is absorbed through escape to the equilibrium chamber 66. Thus, effective vibration damping action (low dynamic spring action) against idling vibration, driving rumble, or other such vibration in a medium- to high-frequency range will be produced based on this liquid pressure-absorbing action.

When large-amplitude vibration in a lower frequency range than the tuning frequency is input to the engine mount 10, the moveable rubber film 74 will be pressed towards the equilibrium chamber 66 side due to she relative pressure differential between the pressure receiving chamber 64 and the equilibrium chamber 66. Under the action of this pressing force on the moveable rubber film 74, the moveable rubber film 74 will undergo elastic deformation and be pushed towards the equilibrium chamber 66 side so that the outside peripheral edge of the moveable rubber film 74 separates from the upper wall of the housing space 62 in the partition member 38 and moves towards the equilibrium chamber 66 side, thereby placing the upper communication windows 48 in the communicating state.

The pressure receiving chamber 64 and the equilibrium chamber 66 will thus be placed in communication with one another through the upper communication windows 48, the housing space 62, and the lower communication windows 54 (i.e. the short-circuit passage 73), and the sealed fluid will be induced to flow between the pressure receiving chamber 64 and the equilibrium chamber 66 through the short-circuit passage 73, which includes the upper communication windows 48. Through the flow of fluid through the short-circuit passage 73 (which has lower flow resistance than the orifice passage 72) taking place in this way, the substantial wall spring rigidity of the pressure receiving chamber 64 will be lower, thereby shifting the tuning frequency of the orifice passage 72 further towards the low-frequency end.

In the engine mount 10 according to this embodiment, the moveable rubber film 74 in its diametrical center section is held in contact against the partition member 38; while its outer peripheral section includes both sections that are retained by the split rim portions 84 of the plate spring 78, and sections constituted by the rubber elastic body only and which are situated between the split rim portions 84 in the circumferential direction. Thus, the aperture area of the upper communication windows 48 (i.e. the substantial passage cross sectional area of the short-circuit passage 73) will vary depending on the extent of positive pressure arising in the pressure receiving chamber 64.

Specifically, where the pressure receiving chamber 64 experiences large positive pressure, the zones situated away from the retained sections where the split rim portions 84 are anchored in the outer peripheral section of the moveable rubber film 74 will undergo elastic deformation in opposition to the retention force, but the retained sections where the split rim portions 84 are anchored will be held in their initial state through retention force. This is because the rubber-only sections situated away from the retained sections (the sections where the split rim portions 84 are anchored) will experience relatively low retention force based on the elastic force of the rubber elastic body, while the retained sections to which are anchored the split rim portions 84 that make up part of the plate spring 78 will experience relatively high retention force due to the elasticity of the plate spring 78, as compared with the rubber-only sections.

Figure 5:
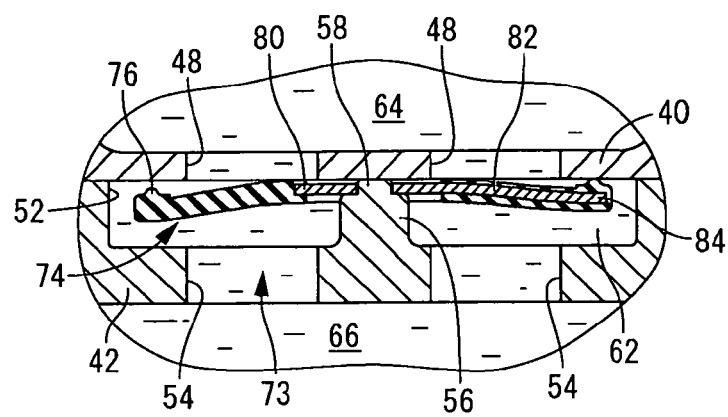
FIG. 5 is a fragmentary enlarged view showing one state of deformation of the moveable rubber film of the engine mount of FIG. 1.

That is, if a relatively large positive pressure should arise in the pressure receiving chamber 64, as depicted in FIG. 5, first, the relatively narrow zones that are situated circumferentially between the split rim portions 84 at the outside peripheral edge of the moveable rubber film 74 will partially separate from the partition member 38, so that the upper communication windows 48 open up with relatively small aperture area. The wall spring rigidity of the pressure receiving chamber 64 will be lower, thereby shifting the tuning frequency of the orifice passage 72 further towards the low-frequency end by flow of sealed fluid between the pressure receiving chamber 64 and the equilibrium chamber 66, through the upper communication windows 48 which now lie partially open at several locations along the circumference of the moveable rubber film 74.

Figure 6:
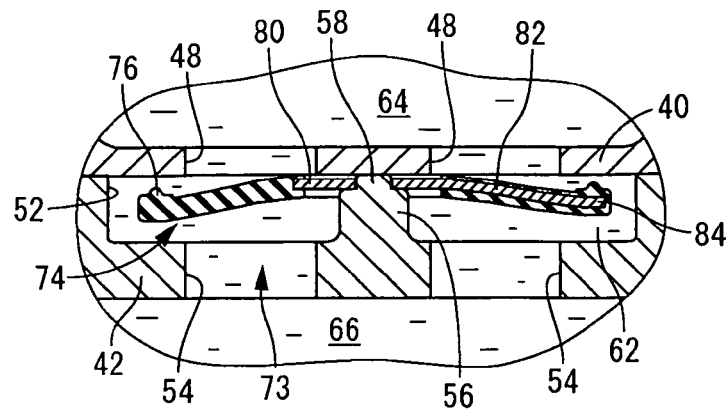
FIG. 6 is a fragmentary enlarged view showing another state of deformation of the moveable rubber film of the engine mount of FIG. 1.

Once an even higher level of positive pressure has arisen in the pressure receiving chamber 64, considerable pressing force based on the positive pressure will act on the moveable rubber film 74. When such large pressing force acts on the moveable rubber film 74, as depicted in FIG. 6, the rubber-only sections situated away from the split rim portion 84 anchoring sections in the outer peripheral section of the moveable rubber film 74 will experience even greater elastic deformation and move a greater distance apart from the partition member 38.

Furthermore, the action of such a high level of pressing force on the moveable rubber film 74 as described above will also induce the split rim portion 84 anchoring sections in the moveable rubber film 74 to undergo elastic deformation in opposition to the elastic force of the plate spring 78. Specifically, as depicted in FIG. 6, the plate spring 78 anchoring sections of the moveable rubber film 74 will undergo elastic deformation, causing the retaining sections where the split rim portions 84 are anchored to the outer peripheral section of the moveable rubber film 74 to now separate from the partition member 38.

In this embodiment, in the plate spring 78, the spoke-shaped spring portions 82 that extend radially from the central constraining portion 80, as well as the split rim portions 84 that are integrally formed with the outside peripheral distal ends of the spoke-shaped spring portions 82, are both thin and narrow in width. Thus, the plate spring 78 may undergo elastic deformation relatively easily in its spoke-shaped spring portions 82 and split rim portions 84.

With the moveable rubber film 74 now separated about its entire circumference from the partition member 38 in this way, a large aperture area of the upper communication windows 48 will be assured. For this reason, fluid flow between the pressure receiving chamber 64 and the equilibrium chamber 66 through the short-circuit passage 73 inclusive of the upper communication windows 48 can be more advantageously produced, whereby the wall spring rigidity of the pressure receiving chamber 64 can be shifted further towards the low-frequency end. Accordingly, it is possible to adjust tuning frequency of the orifice passage 72 to the lower frequency.

In the engine mount 10 according to this embodiment, the aperture area of the upper communication windows 48 will vary depending on the level of positive pressure of the pressure receiving chamber 64, namely, amplitude of the input vibration. Thus, liquid pressure of the pressure receiving chamber 64 can be prevented from escaping to the equilibrium chamber 66 through the short-circuit passage 73 any more than necessary, and a sufficient flow of fluid through the orifice passage 72 can be assured, thereby achieving an intended effective vibration damping action. At the same time, tuning frequency of the orifice passage 72 can be automatically adjusted depending on input vibration, and high damping action based on fluid flow through the orifice passage 72 is effectively achieved even when lower-frequency, larger-amplitude vibration than the vibration to be originally damped by the orifice passage 72 is input.

As will appreciated from the description above, in the engine mount 10 according to this embodiment, the opening/closing control member, which is adapted to hold the upper communication windows 48 in the closed off state in instances where a relatively small positive pressure acts on the pressure receiving chamber 64 by input of the vibration to be damped while opening up the upper communication windows 48 with an appropriate aperture area in instances where a higher level of positive pressure acts on the pressure receiving chamber 64, may be realized by virtue of the elasticity of the moveable rubber film 74 having plate spring 78.

Figure 7:
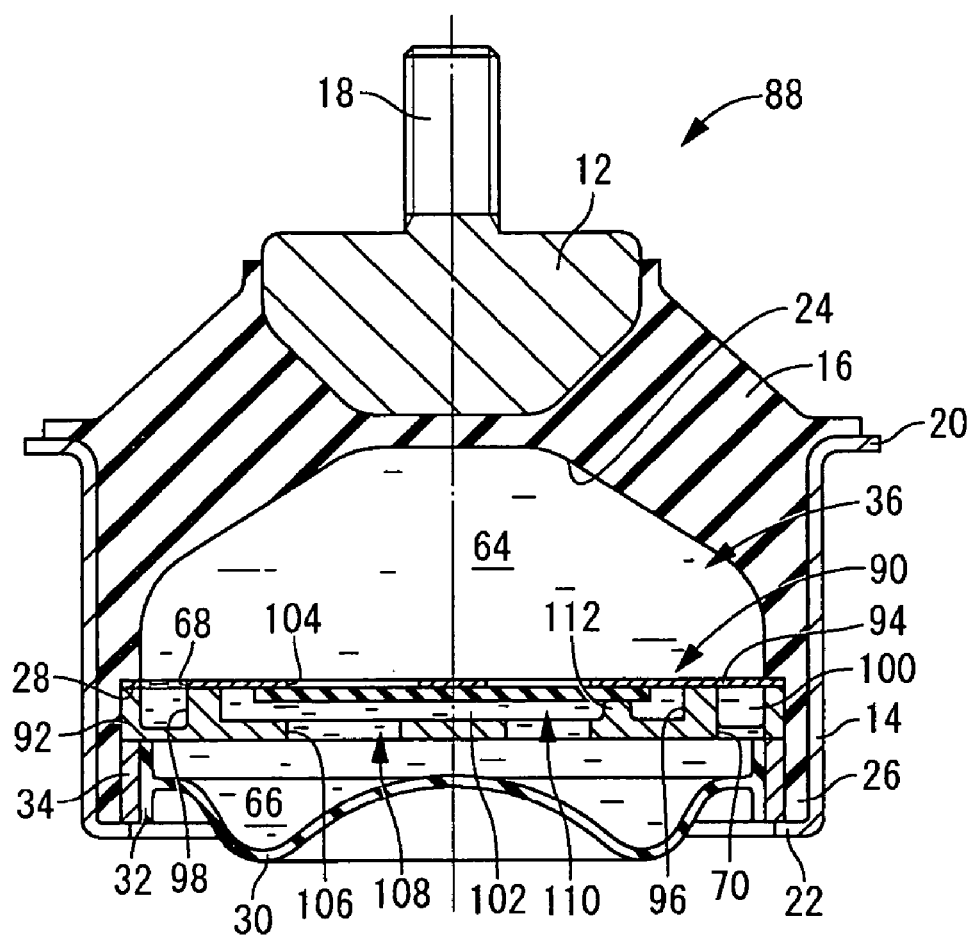
FIG. 7 is an engine mount of construction according to a second embodiment of the present invention, taken along line 7-7 of FIG. 8.

Next, an automotive engine mount 88 will be described by way of a second embodiment of the fluid filled type vibration damping device according to the present invention, depicted in FIG. 7. In the description hereinbelow, elements substantially identical to those in first embodiment are assigned like symbols and are not described in detail.

The engine mount 88 is provided with a partition member 90. This partition member 90 is a high-rigidity member formed from iron, aluminum alloy or the like of thick, large-diameter generally circular disk shape. The partition member 90 includes a partition member main body 92 and a cover fitting 94.

The partition member main body 92 presents a generally circular disk shape overall, and in its center section has a housing recess 96 of circular shape that opens upward. A circumferential groove 98 that opens onto the upper end face and that extends for a prescribed length short of full circle in the circumferential direction is formed in the outer peripheral section of the partition member main body 92.

The cover fitting 94 is a high-rigidity member of thin, generally circular disk shape having approximately the same outside diameter as the partition member main body 92, and is arranged on the same center axis as the partition member main body 92 and juxtaposed against the upper end face thereof, to constitute the partition member 90.

In this embodiment, the juxtaposed partition member main body 92 and cover fitting 94 are attached fitting to the inner peripheral side of the second mounting member 14 while clasped in the axial direction between the shoulder portion 28 that was formed at the lower end of the main rubber elastic body 16, and the fastener fitting 34 that was attached to the outside peripheral face of the diaphragm 30; and is thereby secured in the axial direction between the partition member main body 92 and the cover fitting 94.

As in the first embodiment described previously, the partition member 90 will be fastened supported with its outside peripheral face in intimate contact against the second mounting member 14, by being inserted within the second mounting member 14, and in this state subjecting the second mounting member 14 to a diameter reduction process.

With the partition member 90 installed in the second mounting member 14, the opening of the circumferential groove 98 that was formed at the outside peripheral edge of the partition member main body 92 will be covered by the cover fitting 94. A tunnel-like passage that extends in the circumferential direction through the outer peripheral section of the partition member 90 is formed thereby. Furthermore, at locations corresponding to the circumferential ends of the circumferential groove 98, an upper connecting passage 68 is formed in the cover fitting 94, while a lower connecting passage 70 is formed in the partition member main body 92. The circumferential ends of the circumferential groove 98 communicate with the pressure receiving chamber 64 and with the equilibrium chamber 66 through the upper and lower connecting passages 68, 70, and this circumferential groove 98 is utilized to form an orifice passage 100 that interconnects the pressure receiving chamber 64 and the equilibrium chamber 66.

A housing space 102 is formed in the center section of the partition member 90. The housing space 102 is formed when the opening of the housing recess 96 that was formed in the partition member main body 92 is covered with the cover fitting 94.

Figure 8:
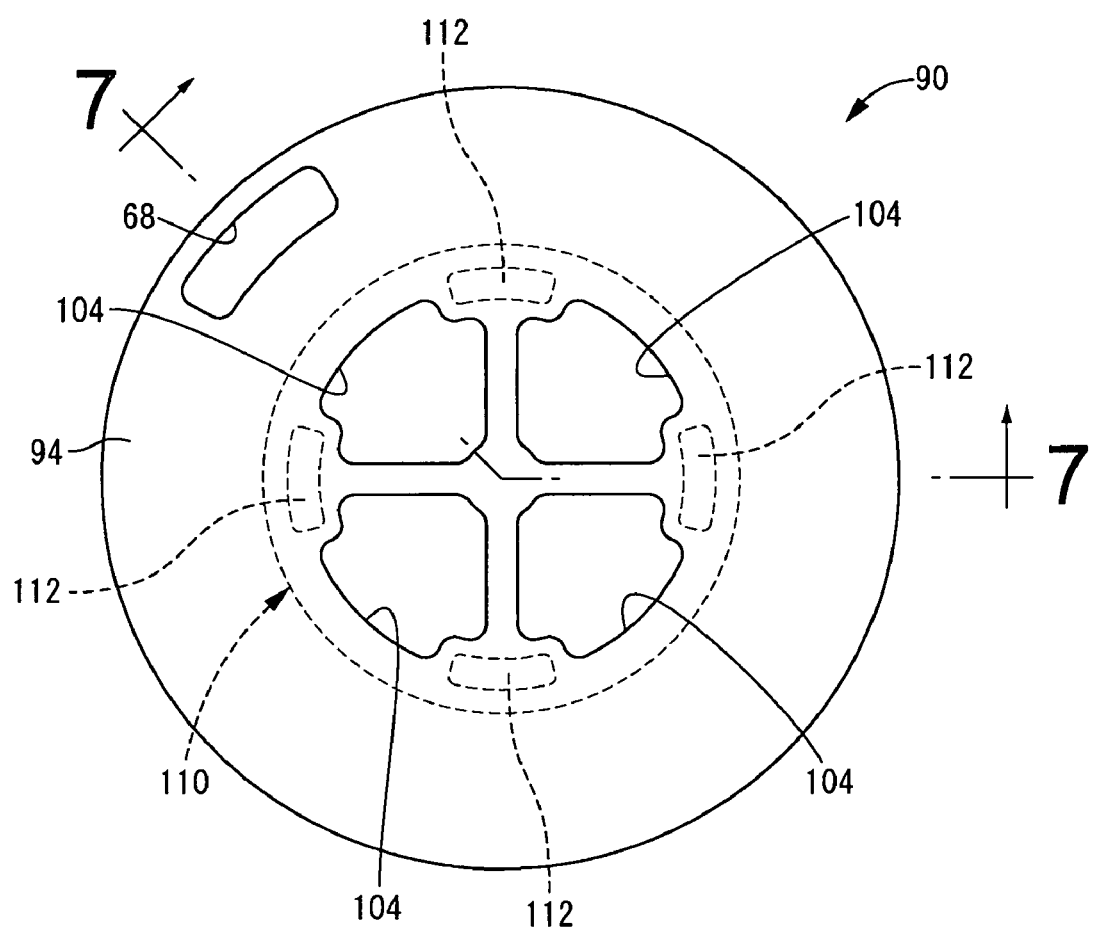
FIG. 8 is a top plane view of a partition member of the engine mount of FIG. 7.

Furthermore, upper communication windows 104 serving as communication passages have been formed perforating the diametrically medial section of the cover fitting 94 that constitutes the upper wall face of the housing space 102. As depicted in FIG. 8, these upper communication windows 104 have fan-shaped appearance with a center angle of approximately 90° viewed in the axial direction. Four of these upper communication windows 104 are formed at equidistant intervals in the circumferential direction. The housing space 102 communicates with the pressure receiving chamber 64 through these upper communication windows 104.

Moreover in addition, lower communication windows 106 have been formed perforating the diametrically medial section of the partition member main body 92 that constitutes the lower wall face of the housing space 102. The lower communication windows 106 are of shape corresponding generally to that of the upper communication windows 104 viewed in the axial direction. Four of these lower communication windows 106 are formed on the circumference at locations corresponding to the upper communication windows 104. The housing space 102 communicates with the equilibrium chamber 66 through these lower communication windows 106.

The housing space 102 communicates with the pressure receiving chamber 64 through the upper communication windows 104, and communicates with the equilibrium chamber 66 through the lower communication windows 106. A short-circuit passage 108 that interconnects the pressure receiving chamber 64 and the equilibrium chamber 66 and that includes the upper communication windows 104 is constituted thereby. From the above discussion it will be appreciated that the short-circuit passage 108 is formed so as to connect the pressure receiving chamber 64 and the equilibrium chamber 66 at a location different from the orifice passage 100.

Within the housing space 102, a moveable rubber film 110 is disposed as the obstructing rubber elastic plate. The moveable rubber film 110 is formed by a rubber elastic body having generally round disk shape of outside diameter smaller than the inside diameter of the housing space 102, and of size so as to extend outwardly beyond the outside peripheral edges of the upper communication windows 104. The moveable rubber film 110, arranged thusly within the housing space 102, will be acted upon at a first face thereof by liquid pressure of the pressure receiving chamber 64 through the upper communication windows 104 and at the other face by liquid pressure of the equilibrium chamber 66 through the lower communication windows 106.

In this embodiment, the outer peripheral section of the moveable rubber film 110 is constrained by clasping projections 112 that function as constraining members. As depicted in FIGS. 7 and 8, the clasping projections 112 have been integrally formed so as to project upward from the diametrical center section of the partition member main body 92 and into the outer peripheral section of the housing space 102. As depicted in FIG. 7, the outer peripheral section of the moveable rubber film 110 is constrained by being held clasped between the distal end faces of the clasping projections 112 and the cover fitting 94 that defines the upper wall of the housing space 102. In this embodiment, the clasping projections 112 are formed at four locations along the circumference as shown by the broken lines in FIG. 8, with each clasping projection 112 extending a prescribed length in the circumferential direction.

With the moveable rubber film 110 arranged thusly within the housing space 102 with its outside peripheral portion constrained in this way, the upper communication windows 104 through which the housing space 102 communicates with the pressure receiving chamber 64 will be blocked off by the moveable rubber film 110, so that short-circuit passage is cut off by the moveable rubber film 110.

With the engine mount 88 of the above construction installed in a vehicle, when low-frequency, large-amplitude vibration corresponding to engine shake is input, vibration damping effect will be produced on the oasis of the resonance effect etc. of non-compressible fluid induced to flow through the orifice passage 100. When medium- to high-frequency, small-amplitude vibration such as idling vibration or driving rumble is input, liquid pressure-absorbing action will be effectively produced through miniscule deformation of the moveable rubber film 110 based on the pressure differential between the pressure receiving chamber 64 and the equilibrium chamber 66, so vibration damping action through low dynamic spring action can be obtained.

At times of input of normal vibration, the moveable rubber film 110 is retained in a state of contact against the upper wall of the housing space 102 by means of the elasticity of the moveable rubber film 110 per se, thereby holding the upper communication windows 104 in the closed state. Thus, sufficient liquid pressure of the pressure receiving chamber 64 will be assured, and fluid flow through the orifice passage will be effectively produced. Consequently, the desired vibration damping effect may be effectively achieved.

If large-amplitude vibration in a lower frequency range than the tuning frequency of the orifice passage 100 is input to the engine mount 88, zones situated in the outer peripheral section of the moveable rubber film 110 but away from the clasping projections 112 will undergo elastic deformation and separate from the partition member 90. Accordingly, the upper communication windows 104 open up and the pressure receiving chamber 64 and the equilibrium chamber 66 communicate with each other through the short-circuit passage 108 inclusive of the upper communication windows 104.

Then, fluid flow through the short-circuit passage 108 will arise between these two chambers 64, 66 and the substantial wall spring rigidity of the pressure receiving chamber 64 becomes lower so that the tuning frequency of the orifice passage 100 will be shifted depending on the input vibration. Therefore, the engine mount 88 is able to achieve an intended vibration damping effect utilizing the flow action of the fluid through the orifice passage 100 over a wide effective frequency range.

Moreover, the outer peripheral section of the moveable rubber film 110 is retained in a state of contact against partition member 90 at four locations along the circumference by the clasping projections 112 so that the upper communication windows 104 partially open up at several locations along the circumference due to elastic deformation of the moveable rubber film 110. With this arrangement, even in the communicating state of the upper communication windows 104, fluid flow through the short circuit passage 108 is limited and sufficient liquid pressure of the pressure receiving chamber 64 will be assured. Consequently, fluid flow through the orifice passage 100 will be advantageously induced, thereby effectively exhibiting vibration damping effect based on the flow action of the fluid against vibration in the lower frequency range as well.

Figure 9:
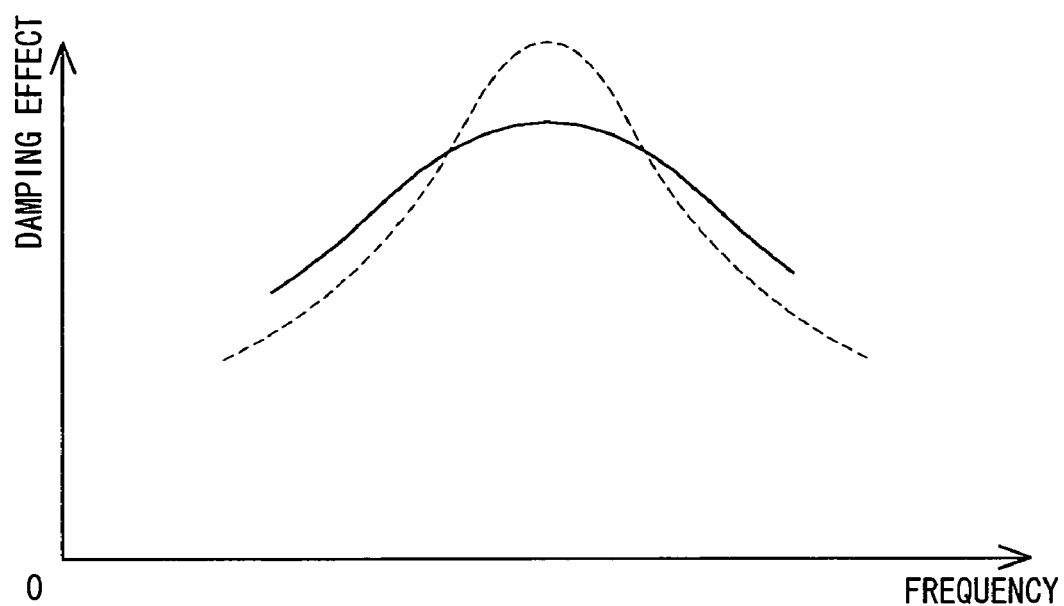
FIG. 9 is a graph demonstrating vibration damping capability of the engine mount of FIG. 7.
Figure 10:
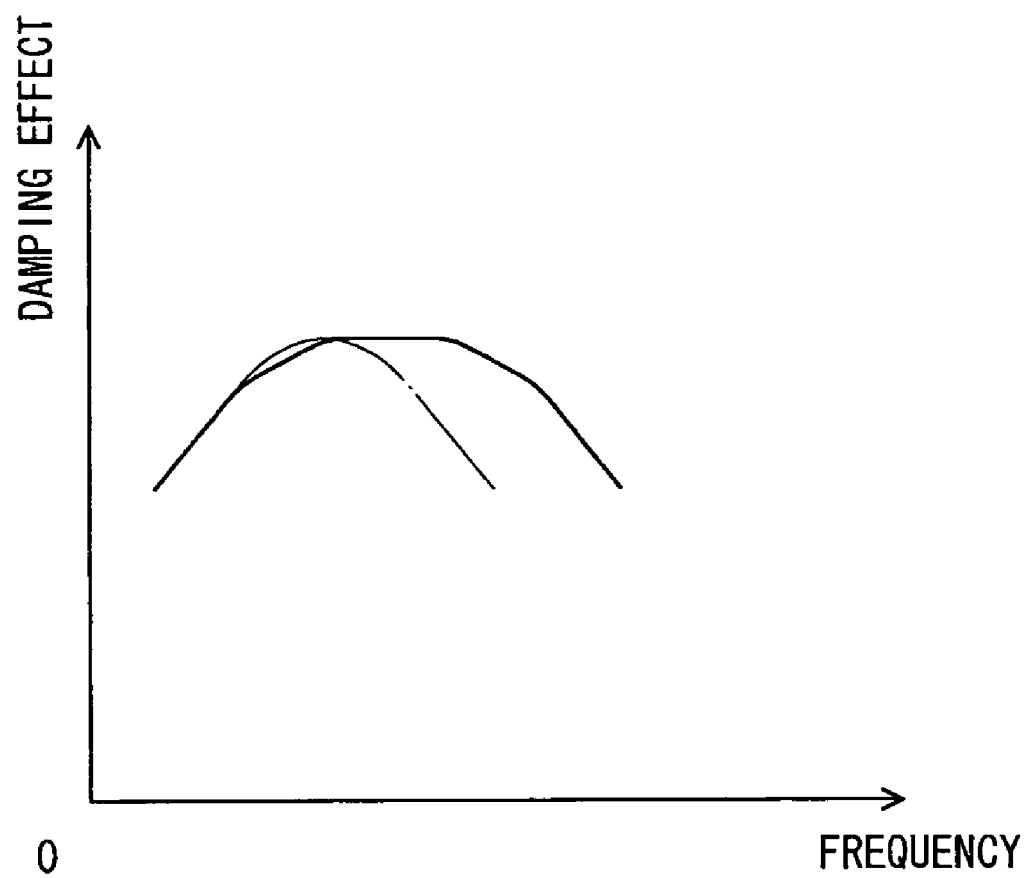
FIG. 10 is a graph demonstrating vibration damping capability of the engine mount of FIG. 7.

Additionally, the ability of the fluid filled type vibration damping device according to the present invention to exhibit vibration damping effect against a wider frequency range based on the flow action of fluid flowing through the orifice passage will be apparent from the measurements shown in FIGS. 9 and 10.

Specifically, as compared to measurements (indicated by the broken line in FIG. 9) of Comparative Example 1 obtained using a fluid filled type vibration damping device of conventional construction lacking a liquid pressure escape mechanism, measurements (indicated by the solid line in FIG. 9) for an example in which a fluid filled type vibration damping device of construction according to the present invention was employed show effective high damping effect over a wider frequency range. Also, as shown in FIG. 9, while the maximum value of damping force observed in the measurements of the example was smaller than the maximum value of damping force observed in the measurements for Comparative Example 1, in the example, damping force sufficient to produce the desired vibration damping effect could be achieved over a wider frequency range, so the lower damping force posed substantially no problem.

According to FIG. 10, as compared to measurements (indicated by the dot-and-dashed line in the drawing) of Comparative Example 1 obtained using a fluid filled type vibration damping device of construction lacking a mechanism to adjust the aperture area of the communicating passage (i.e. lacking a constraining member for constraining the outside peripheral edge of the obstructing rubber elastic plate), the measurements (indicated by the solid line in the drawing) for an example according to the present invention demonstrate effective high damping effect over a wider frequency range. It will therefore be appreciated from the above measurements that the fluid filled type vibration damping device according to the present invention affords vibration damping effect based on fluid flow through the orifice passage, over a wider frequency range.

While the present invention has been shown hereinabove in terms of certain preferred embodiments, these are merely illustrative and should in no wise be construed as limiting the invention to the specific disclosure herein.

For example, the main moveable rubber film 74 shown in the first and second embodiments is merely exemplary of the obstructing rubber elastic plate according to the present invention, and the specific construction of the obstructing rubber elastic plate should not be construed as limited to the specific construction taught in the first and second embodiments.

Figure 11:
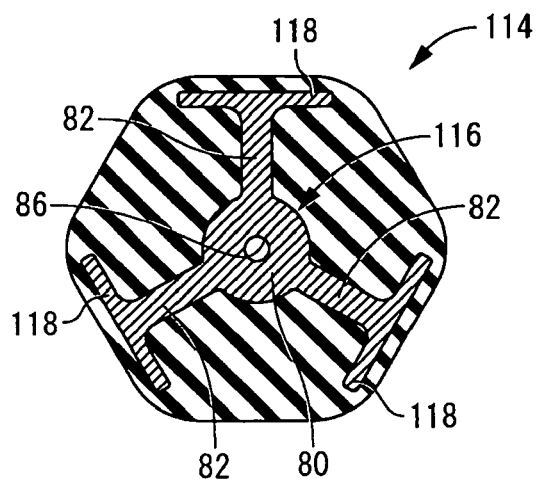
FIG. 11 is a moveable rubber film of another arrangement employed in the present invention.

As a specific example, the moveable rubber film 114 depicted in FIG. 11 could be employed as the obstructing rubber elastic plate. Specifically, this moveable rubber film 114 is provided with a plate spring 116 that is formed by a rubber elastic body of generally hexagonal shape viewed in the axial direction (i.e. perpendicular to the plane of the page in FIG. 11).

Like those in the first and second embodiments, the plate spring 116 is made of metal or synthetic resin, and is of plate shape integrally incorporating a central constraining portion 80, spoke-shaped spring portions 82, and split rim portions 118. The split rim portions 118 are linear in shape and perpendicular to the spoke-shaped spring portions 82, and have been integrally formed at the outside peripheral distal ends of the spoke-shaped spring portions 82 so as to extend along the contours of the moveable rubber film 114.

The plate spring 116 having the above construction is anchored to the rubber elastic body of generally hexagonal shape viewed in the axial direction, to form the moveable rubber film 114. By employing the moveable rubber film 114 of this construction as the obstructing rubber elastic plate it will be possible to achieve both the desired effect of eliminating noise caused by cavitation, as well as the orifice effect over a wide frequency range.

The obstructing rubber elastic plate may of course have a polygonal shape etc. other than hexagonal. Also, the obstructing rubber elastic plate may utilize a rubber elastic body that has been pre-molded to hexagonal or other polygonal shape. Alternatively, a rubber elastic body that has been pre-molded to circular shape may be subjected to post-molding shrinkage etc. to produce a final shape having a contour section of polygonal or linear chord shape. That is, no particular limitation is imposed on the shape of the obstructing rubber elastic plate.

Figure 12:
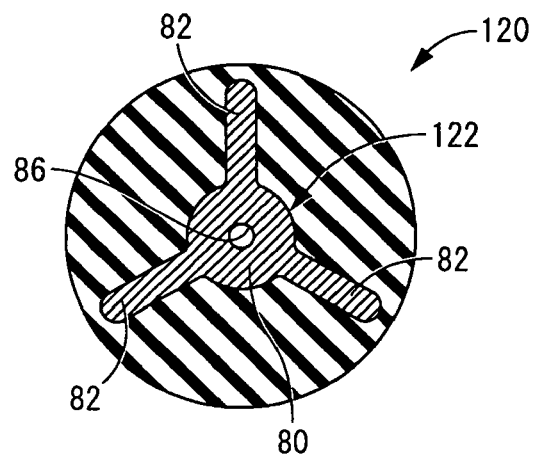
FIG. 12 is a moveable rubber film of another arrangement employed in the present invention.

For example, it would be possible to employ as the obstructing rubber elastic plate one like the moveable rubber film 120 depicted in FIG. 12, having a structure in which a plate spring 122 composed of a central constraining portion 80 and spoke-shaped spring portions 82 is anchored by being embedded in a rubber elastic body of circular disk shape. By employing a plate spring 122 of this structure from which the split rim portions 84 extending in the circumferential direction have been omitted, zones situated away from sections where the plate spring 122 is anchored at the outside peripheral edge of the moveable rubber film 120 will have greater free length, thus allowing elastic deformation to take place more easily at the outside peripheral edge. Consequently, a larger aperture area will be possible for the upper communication windows 48 in those zones situated away from the plate spring 122 anchoring sections.

Where the moveable rubber film 74 is one like that shown in the first and second embodiments having a plate spring 78 provided with split rim portions 84, by appropriately establishing the length of the split rim portions 84 in the circumferential direction it will be possible to adjust the aperture area of the upper communication windows 48 in the absence of deformation of the plate spring 78, as well as the aperture area of the upper communication windows 48 with deformation of the plate spring 78.

Figure 13:
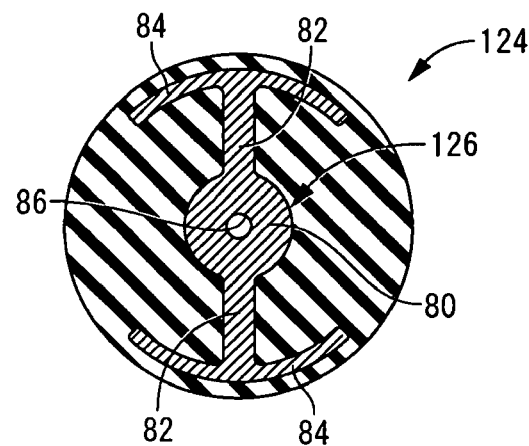
FIG. 13 is a moveable rubber film of another arrangement employed in the present invention.

If, as in the moveable rubber film 124 depicted in FIG. 13 for example, a plate spring 126 having a structure in which spoke-shaped spring portions 82 extend to either side along an axis lying in the axial-perpendicular direction and in which split rim portions 84 are integrally formed respectively at the circumferential distal ends of the spoke-shaped spring portions 82 could also be employed as the obstructing rubber elastic plate. Thus, the number, shape etc. of the spoke-shaped spring portions or of split rim portions is not limited in any particular way and can be established appropriately according to the required vibration damping characteristics.

Figure 14:
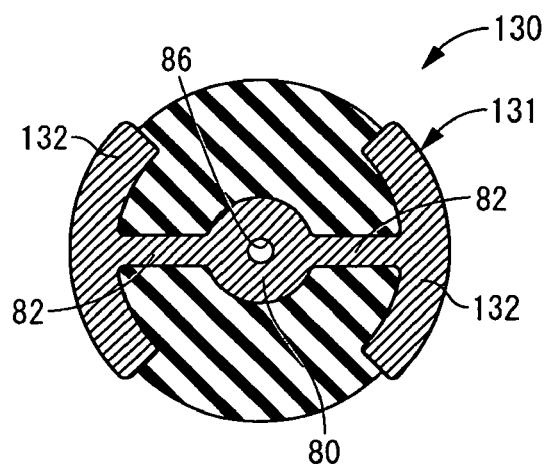
FIG. 14 is a moveable rubber film of another arrangement employed in the present invention.

In the moveable rubber film 74 taught in the first and second embodiments above, the split rim portions 84 provided at the outside peripheral edge of the plate spring 78 have a structure entirely embedded in the rubber elastic body. However, a film in which the split rim portions 132 of the plate spring 131 lie exposed at the outside peripheral face of the moveable rubber film 130, as with the moveable rubber film 130 depicted in FIG. 14, could also be employed as the obstructing rubber elastic plate. The split rim portions may also lie partially exposed in the circumferential direction. Additionally, some or all of the split rim portions may lie exposed to one or both sides of the obstructing rubber elastic plate in its thickness direction.

The plate spring need not necessarily be anchored to the obstructing rubber elastic plate in a state of embedment within the rubber elastic body. For instance, an obstructing rubber elastic plate furnished with a constraining member could also be achieved by affixing the plate spring so as to be juxtaposed against one face of a rubber elastic body of circular disk shape.

While the moveable rubber film 74 taught in the first and second embodiments above employs a constraining member of a structure having a plate spring 78 of metal or hard synthetic resin attached, even where the obstructing rubber elastic plate consists of a rubber elastic body only, a constraining member therefor could be realized by attaching a reinforcing body of a rubber elastic body constituted as a separate element, or by appropriate modifications to thickness, shape etc.

Figure 15:
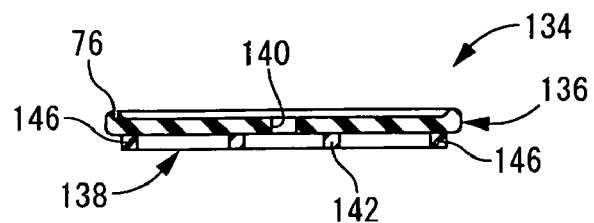
FIG. 15 is a moveable rubber film of another arrangement employed in the present invention, taken along line 15-15 of FIG. 16.
Figure 16:
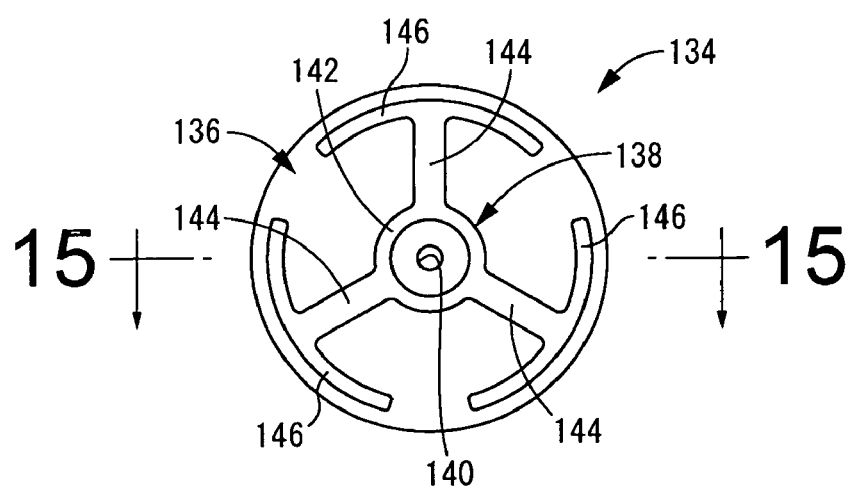
FIG. 16 is a bottom plane view of the moveable rubber film of FIG. 15.

Specifically, as with the moveable rubber film 134 depicted in FIGS. 15 and 16 for example, the constraining member for attachment to the rubber elastic main body 136 could consist of a reinforcing body 138 formed of a rubber elastic body. The rubber elastic main body 136 is a rubber elastic body of generally circular disk shape having an integrally formed contact projection 76 projecting upward at is outside peripheral edge, and having a circular through-hole 140 formed in its center part.

As depicted in FIG. 16, the reinforcing body 138 is formed by a rubber elastic body and has a central annular portion 142, spoke-shaped spring portions 144, and split rim portions 146. In rear view, it is similar in shape to the plate spring 78 taught in the preceding first and second embodiments. The central annular portion 142 is a small-diameter, generally circular ring shape, and constitutes the center section of the reinforcing body 138. The elongated spoke-shaped spring portions 144 are integrally formed with the central annular portion 142 and extend radially towards the outside peripheral side. The split rim portions 146 are integrally formed respectively at the outside peripheral distal ends of the spoke-shaped spring portions 144, and extend for prescribed length in the circumferential direction. The reinforcing body 138 may have a spring constant that is higher than the spring constant of the rubber elastic main body 136.

With the moveable rubber film 134 composed of a reinforcing body 138 of such a structure juxtaposed against and affixed to a face on the equilibrium chamber 66 side of the rubber elastic main body 136, the constraining member can be realized through the reinforcing body 138 formed by a rubber elastic body. Thus, it is not always necessary to employ a separate member such as a plate spring made of metal or hard synthetic resin as the constraining member, and the constraining member could also be implemented using a rubber elastic body.

The reinforcing body 138 may also be integrally formed with the rubber elastic main body 136. Specifically, a constraining member can be realized by making the moveable rubber film 134 partially thicker so as to increase the spring constant in the thicker section. The number of parts can be minimized thereby, and an operation to attach the reinforcing body 138 and the rubber elastic main body 136 will not be necessary. Separate or unified reinforcing bodies 138 may be disposed on both sides of the rubber elastic main body 136 as well.

While the preceding second embodiment teaches a structure in which the outer peripheral section of the moveable rubber film 110 is constrained by the partition member 90, in this sort of structure wherein the outer peripheral section of the obstructing rubber elastic plate is constricted by a partition member, the constraining member is not limited to the structure shown in the second embodiment.

Figure 17:
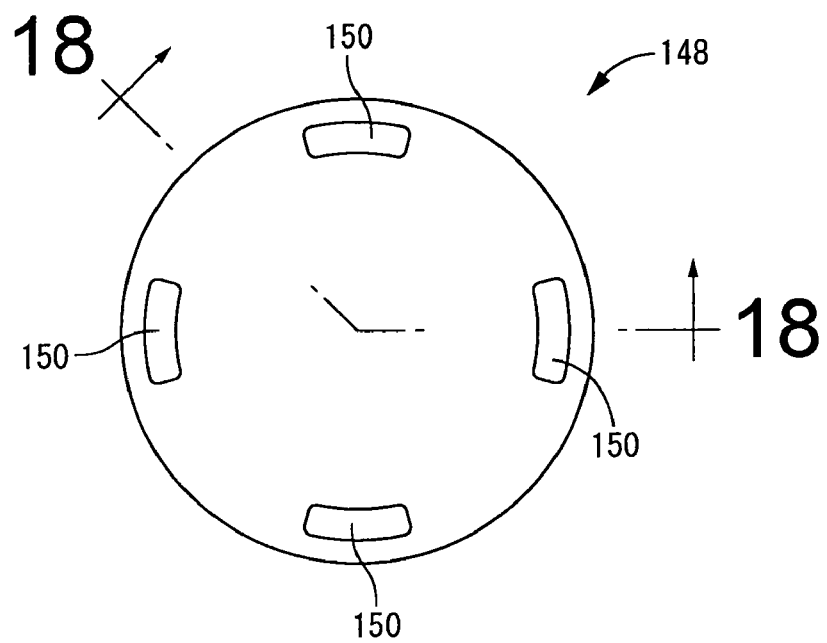
FIG. 17 is a bottom plane view of a moveable rubber film of another arrangement employed in the present invention.

For example, there could be employed a structure like that of the moveable rubber film 148 depicted in FIG. 17, having constraining projections 150 serving as constraining members integrally formed in the outer peripheral section of the moveable rubber film 148. Specifically, constraining projections 150 of block shape projecting downward are formed at four locations along the circumference of the outer peripheral section of the moveable rubber film 148 of circular disk shape.

The moveable rubber film 148 is arranged housed within a housing space 102 of the partition member 152. The partition member 152 includes a partition member main body 154 and a cover fitting 94. The partition member main body 154 has a large-diameter, generally circular disk shape, with a housing recess 96 formed in its diametrical center section, and a circumferential groove 98 formed in its outer peripheral section. Lower communication windows 106 have been formed perforating the base wall part of the housing recess 96. A support projection 156 is integrally formed at the center section of the housing recess 96. The support projection 156 is integrally formed with the partition member main body 154 so as to project upward from the base wall part of the housing recess 96 and has a small-diameter, generally frustoconical shape in the present mode. The partition member main body 154 and the cover fitting 94 having the above construction are juxtaposed against one another in the axial direction, with the housing space 102 being formed in the diametrical center section between the partition member main body 154 and the cover fitting 94.

Figure 18:
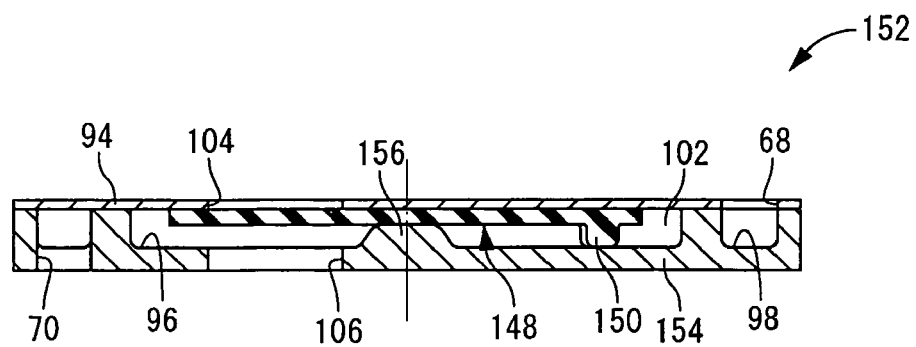
FIG. 18 is a cross sectional view showing the moveable rubber film of FIG. 17 accommodated within the partition member, taken along line 18-18 of FIG. 17.

Then, with the moveable rubber film 148 arranged in the housing space 102 as depicted in FIG. 18, the lower end faces of the constraining projections 150 will be positioned in contact against the lower wall face of the housing space 102, and the upper face of the outer peripheral section of the moveable rubber film 148 will be juxtaposed and positioned in contact against the lower wall face of the housing space 102. Thus, sections where the constraining projections 150 have been formed in the outer peripheral section of the moveable rubber film 148 will be clasped between the partition member main body 154 and the cover fitting 94 so as to be constrained by the partition member 152. Thus, a constraining member for constraining the outer peripheral section of the moveable rubber film 148 can be realized through the structure depicted in FIGS. 17 and 18 as well. In the mode depicted in FIGS. 17 and 18, the center section of the moveable rubber film 148 is secured clasped between the cover fitting 94 and the support projection 156 which has been provided to the partition member main body 154.

Figure 19:
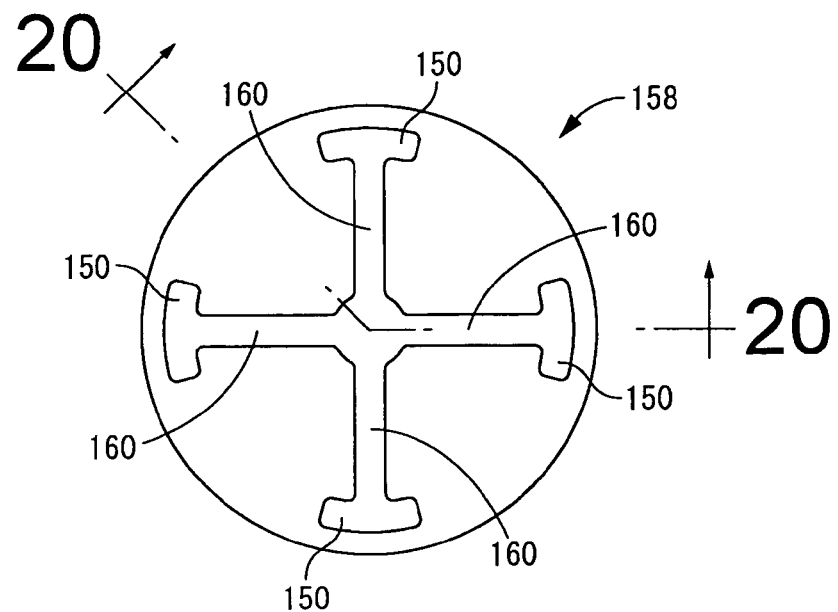
FIG. 19 is a bottom plane view of a moveable rubber film of another arrangement employed in the present invention.
Figure 20:
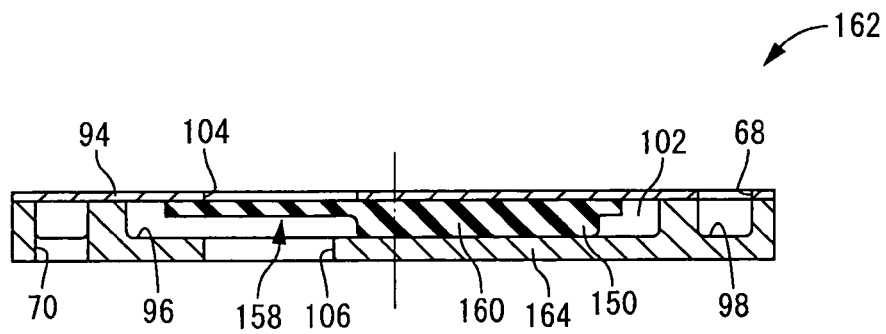
FIG. 20 is a cross sectional view showing the moveable rubber film of FIG. 19 accommodated within the partition member, taken along line 20-20 of FIG. 19.

There might also be employed a structure whereby constraining projections 150 that have been formed in the outer peripheral section of a moveable rubber film 158 are linked by spoke-shaped spring portions 160 that extend radially as depicted in FIGS. 19 and 20. In the moveable rubber film 158 according to this mode, the diametrical center section of the moveable rubber film 158 will jut up at substantially identical height to the constraining projections 150, and thus in the partition member 162 on which the moveable rubber film 158 has been arranged, the diametrical center section of the partition member main body 164 constituting part of the member will have a flat shape devoid of features (e.g. the support projection 156). Also, in this mode, the spoke-shaped spring portions 160 will be formed projecting downward with substantially identical projecting height as the constraining projections 150, and all sections of the moveable rubber film 158 that are constituted by the spoke-shaped spring portions 160 will be constrained by the partition member 162.

Figure 21:
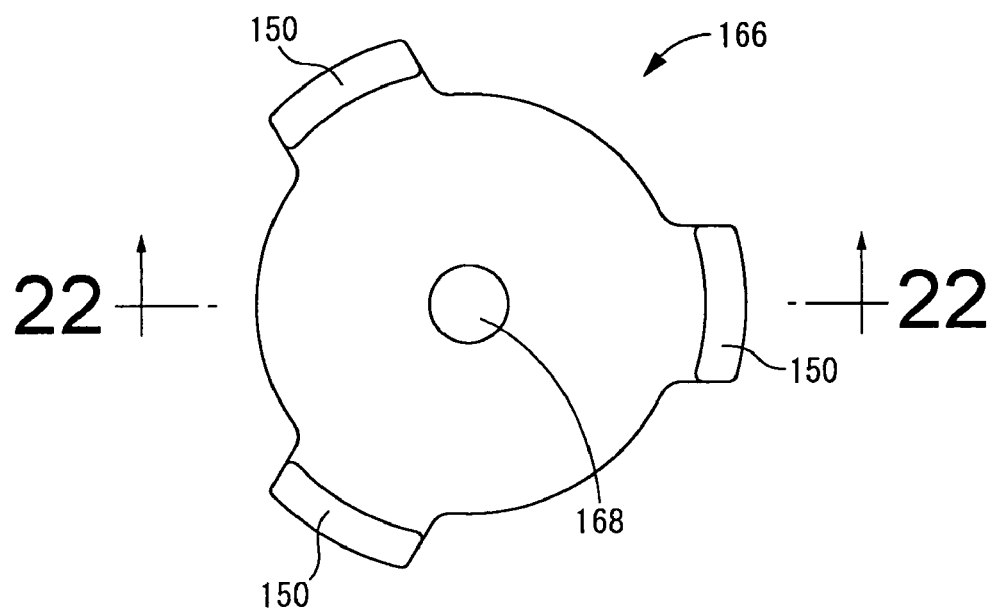
FIG. 21 is a bottom plane view of a moveable rubber film of another arrangement employed in the present invention.
Figure 22:
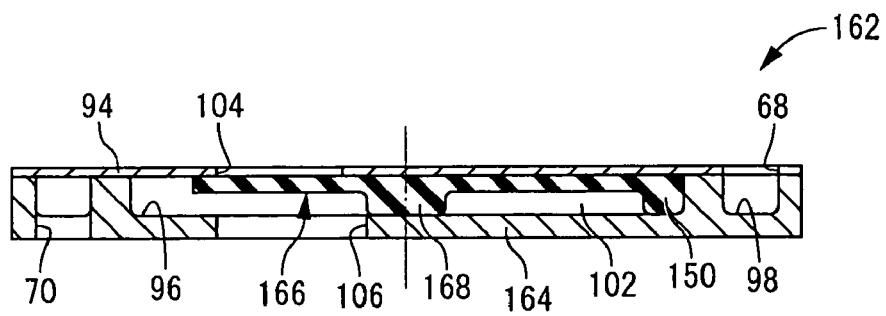
FIG. 22 is a cross sectional view showing the moveable rubber film of FIG. 21 accommodated within the partition member, taken along line 22-22 of FIG. 21.

There may also be employed a structure whereby a moveable rubber film 166 of generally round circular shape extends peripherally outward at several locations about its circumference, with constraining projections 150 being integrally formed with these extended sections as depicted in FIGS. 21 and 22. With such a structure, the outside peripheral edges of the moveable rubber film 166 situated between the constraining projections 150 in the circumferential direction will be located further inward from the constraining projections 150, and thus the moveable rubber film 166 will be able to more easily undergo elastic deformation in zones away from the sections where the constraining projections 150 are formed. In this mode, a center projection 168 of circular block shape is integrally formed in the diametrical center section of the moveable rubber film 166, and projects downwards.

Figure 23:
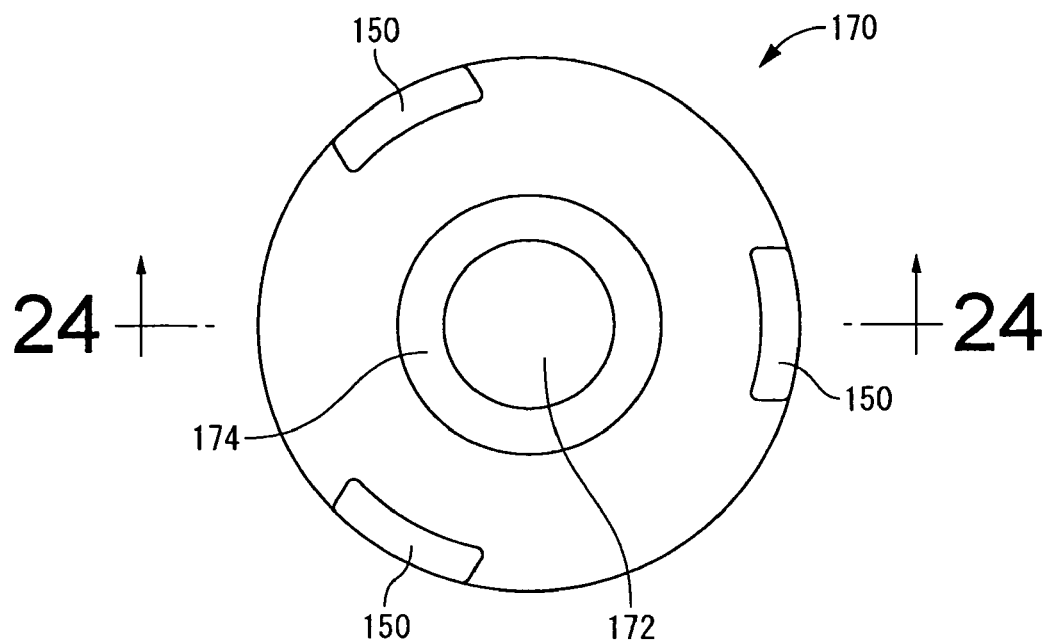
FIG. 23 is a bottom plane view of a moveable rubber film of another arrangement employed in the present invention.
Figure 24:
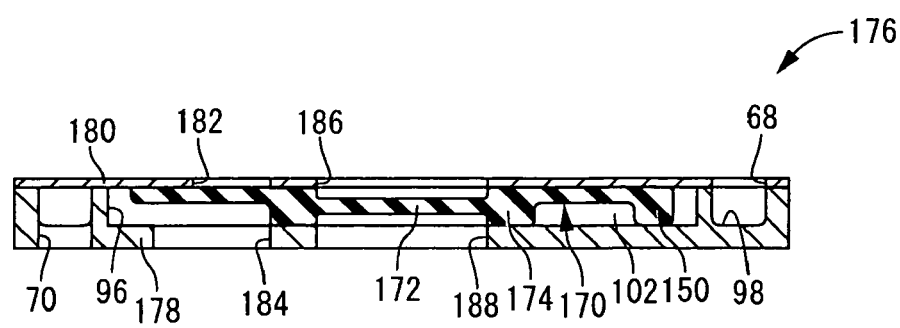
FIG. 24 is a cross sectional view showing the moveable rubber film of FIG. 23 accommodated within the partition member, taken along line 24-24 of FIG. 23.

A structure having a center film portion 172 in its center section, like the moveable rubber film 170 depicted in FIGS. 23 and 24, could also be employed as the obstructing rubber elastic plate for example. In more detail, in the moveable rubber film 170 having a plurality of constraining projections 150 spaced apart in the circumferential direction at its outside peripheral edge, a center tubular portion 174 of round tube shape projecting downward will be integrally formed in the diametrical center section of the film. Additionally, in the axial center section to the inner peripheral side of the center tubular portion 174 there will be formed a thin center film portion 172 that extends in the axial-perpendicular direction, with the center hole of the center tubular portion 174 being sealed off by the center film portion 172.

The moveable rubber film 170 having the above structure will be arranged housed within a housing space 102 of a partition member 176. The partition member 176 has a thick, large-diameter, generally circular disk shape, and includes a partition member main body 178 and a cover fitting 180. The partition member main body 178 and the cover fitting 180 have structures in accordance with those of the partition member main body 154 and the cover fitting 94 taught in the second embodiment. The diametrically medial section of the cover fitting 180 is perforated by an upper communication window 182 that extends for a prescribed length in circumferential direction and serves as a communication passage, while a lower communication window 184 that extends for a prescribed length in circumferential direction is formed in the diametrically medial section of the partition member main body 178. Also, the diametrical center section of the cover fitting 180 is perforated by an upper through-hole 186 of circular shape, while the diametrical center section of the partition member main body 178 is perforated by a lower through-hole 188 corresponding in shape to the upper through-hole 186.

The moveable rubber film 170 will then be arranged within the housing space 102 defined between the juxtaposed faces of the partition member main body 178 and the cover fitting 180. At this point, the center tubular portion 174 of the moveable rubber film 170 will be positioned diametrically between the communication windows 182, 184 and the through-holes 186, 188, and clasped between the partition member main body 178 and the cover fitting 180; while the constraining projections 150 will be positioned peripherally outward from the communication windows 182, 184, and clasped between the partition member main body 178 and the cover fitting 180. The diametrically medial section of the partition member main body 178 will thereby be secured to the partition member 176, and the outside peripheral edge will be partially constrained by the partition member 176.

Pressure of the pressure receiving chamber 64 will bear on the diametrically medial section of a first face of the moveable rubber film 170 through the upper communication window 182, while pressure of the equilibrium chamber 66 will bear on the other face through the lower communication window 184. Furthermore, the pressure of the pressure receiving chamber 64 will bear on one face of the center film portion 172 of the moveable rubber film 170 through the upper through-hole 186, while the pressure of the equilibrium chamber 66 will bear on the other face through the lower through-hole 188.

With the engine mount incorporating the moveable rubber film 170 of the above construction installed in an automobile, when high-frequency, small-amplitude vibration such as idling vibration or driving rumble is input, the center film portion 172 will experience miniscule deformation up and down in a state with its outside peripheral edge constrained. On the basis of liquid pressure-absorbing action produced through this miniscule deformation of the center film portion 172, vibration damping action through low dynamic spring action will be obtained.

Figure 25:
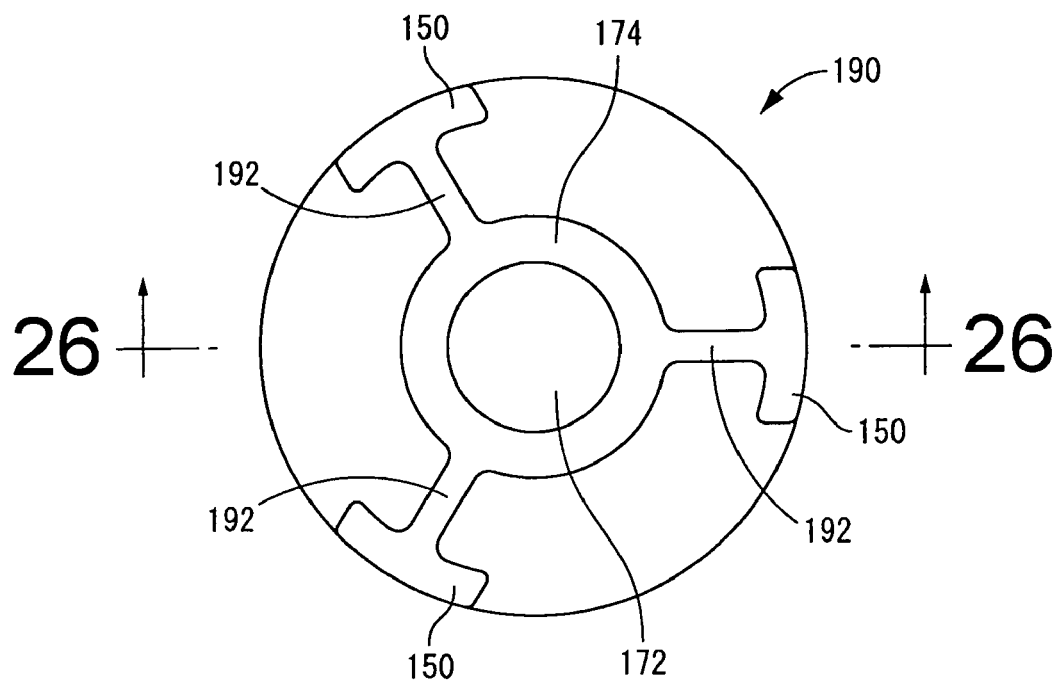
FIG. 25 is a bottom plane view of a moveable rubber film of another arrangement employed in the present invention.
Figure 26:
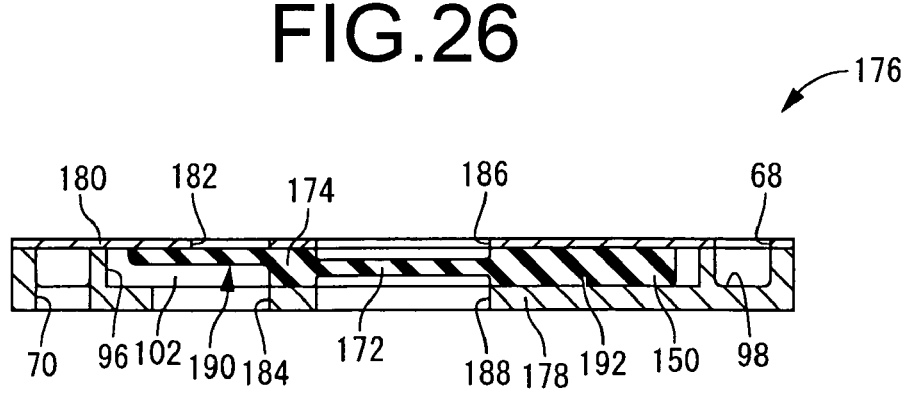
FIG. 26 is a cross sectional view showing the moveable rubber film of FIG. 25 accommodated within the partition member, taken along line 26-26 of FIG. 25.

A structure whereby the center tubular portion 174 and the constraining projections 150 are connected by spoke-shaped spring portions 192 that extend radially, as in the moveable rubber film 190 depicted in FIGS. 25 and 26, could also be employed. By so doing, the rigidity of the moveable rubber film 190 in the outer peripheral section of the moveable rubber film 190 can be adjusted.

In the preceding first embodiment, the diametrical center section of the moveable rubber film 74 was clasped between the upper wall face of the housing space 62 and the support projection 56 in order to fasten it to the partition member 38. However, where a structure in which the diametrical center section of the moveable rubber film 74 is fastened to the partition member 38 is employed, the fastening means is not limited in any particular way.

Figure 27:
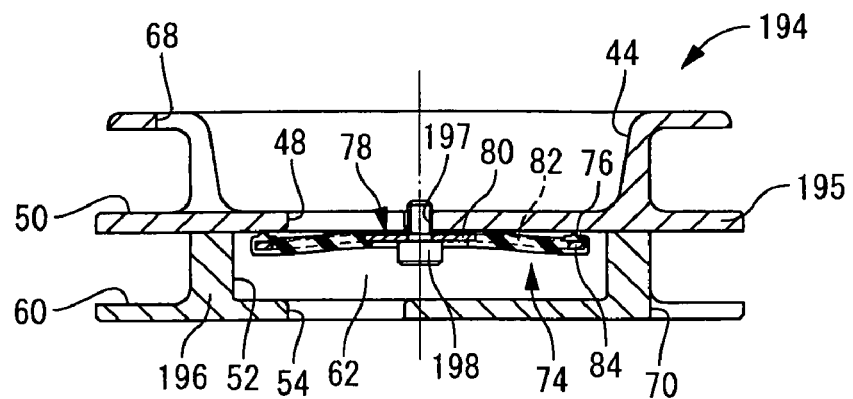
FIG. 27 is a partition member of another arrangement employed in the present invention.

Specifically, the diametrical center section of the obstructing rubber elastic plate may be screw-fastened to the partition member. As a specific example, a structure like that of the partition member 194 depicted in FIG. 27 could be employed. To describe in detail, the partition member 194 is composed of an upper partition fitting 195 and a lower partition fitting 196. The upper partition fitting 195 has a structure in accordance with the upper partition fitting 40 in the first embodiment, and is perforated in its diametrical center section by a bolt hole 197. The bolt hole 197 is a small-diameter circular hole that extends in the axial direction through the upper wall of the housing space 62, and has a screw thread formed on its inside peripheral face. Meanwhile, the lower partition fitting 196 has a structure in accordance with the lower partition fitting 42 in the first embodiment, and its diametrical center section is a flat shape lacking the support projection 56.

The moveable rubber film 74 is then arranged within the housing space 62 of the partition member 194. At this point, a fastening bolt 198 will be passed through an insertion hole 86 that has been formed in the plate spring 78 of the moveable rubber film 74, and the fastening bolt 198 will be screwed into the bolt hole 197 that was formed in the upper partition fitting 195. The diametrical center section of the moveable rubber film 74 will thereby be fastened to the lower partition fitting 196.

Figure 28:
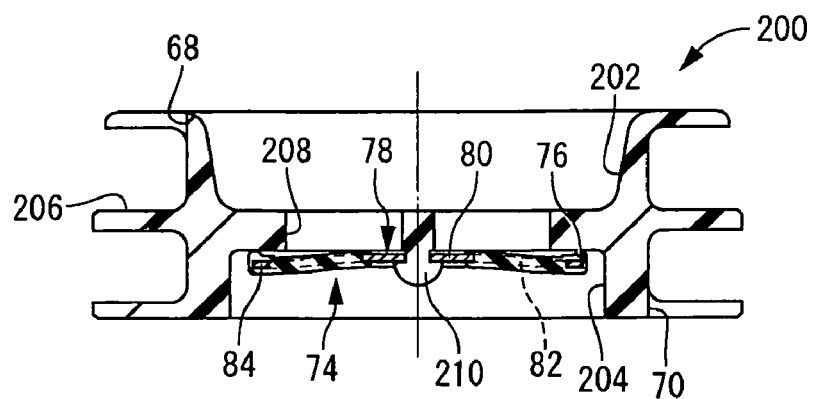
FIG. 28 is a partition member of another arrangement employed in the present invention.

In another example, in a partition member made of hard synthetic resin, the center section of the obstructing rubber elastic plate can be fastened by welding it to the partition member. In more detail, as depicted in FIG. 28, such a partition member 200 will have a thick, generally disk shape overall, in whose diametrical center section there is formed a circular recess 202 that opens onto the upper face, and a housing space 204 that opens onto the lower face. Additionally, at the outside peripheral edge of the partition member 200 there is formed a spiral circumferential groove 206 that opens onto the outside peripheral face and that extends for a length short of twice around the circumference. The partition member 200 will then be attached to the inner peripheral side of the second mounting member 14 in the same way as in the first embodiment, so that the circular recess 202 partially defines the pressure receiving chamber 64 and the housing space 204 partially defines the equilibrium chamber 66, while the orifice passage 72 is formed by the circumferential groove 206.

Furthermore, communication passages 208 pass the base wall part of the circular recess 202 in the axial direction through the diametrically medial section of the partition member 200. Viewed in the axial direction, the communication passages 208 have a generally fan-shaped contour with a center angle of approximately 120°. Three such communication passages 208 are spaced apart at equidistant intervals on the circumference. With the partition member 200 assembled together with the second mounting member 14, the pressure receiving chamber 64 and the equilibrium chamber 66 defined to either side of the partition member 200 will communicate with each other through the communication passages 208.

A welding projection 210 is integrally formed in the diametrical center of the housing space 204 in the partition member 200. The welding projection 210 has a small-diameter rod shape, and projects downward from the upper base wall of the housing space 204.

The moveable rubber film 74 will then be arranged in the housing space 204. Specifically, the welding projection 210 will be passed through the insertion hole 86 of the plate spring 78 that makes up part of the moveable rubber film 74. The distal end section of the welding projection 210 will then be melted with ultrasound, heat etc. and worked to give it larger diameter, as well as affixing it to the center section of the plate spring 78 that lies exposed to the outside. The moveable rubber film 74 is thereby arranged within the housing space 204, with its center section fastened to the partition member 200. Thus, in this way it is possible to fasten the center section of the obstructing rubber elastic plate to the partition member.

Figure 29:
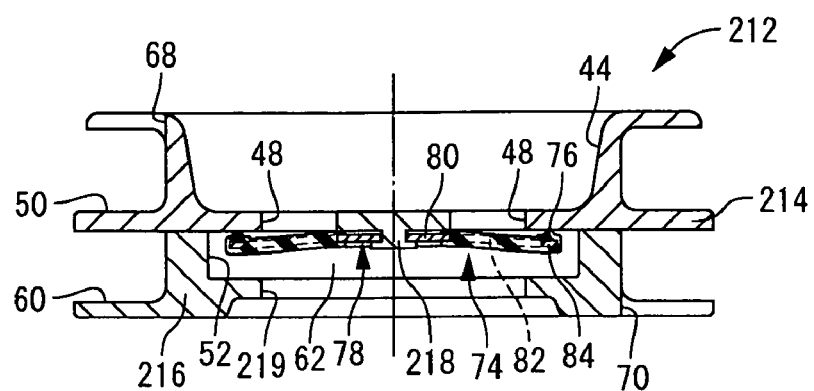
FIG. 29 is a partition member of another arrangement employed in the present invention.

In yet another example, the partition member can be provided with a mating portion that mates with the obstructing rubber elastic plate, and the center section of the obstructing rubber elastic plate fastened to the partition member through the mating action of the mating portion. As a specific example, a structure like that of the partition member 212 depicted in FIG. 29 could be employed. Specifically, this partition member 212 includes an upper partition fitting 214 and a lower partition fitting 216.

The upper partition fitting 214 has a structure in accordance with the upper partition fitting 40 taught in the first embodiment, and in its diametrical center section there is integrally formed a clinching projection 218 as a mating portion that projects downwardly towards the inside of the housing space 62. This clinching projection 218 has a small-diameter rod shape corresponding in shape to an insertion hole 86 which has been formed in the plate spring 78. Meanwhile, the lower partition fitting 216 has a structure in accordance with the lower partition fitting 42 taught in the first embodiment, and in its diametrical center section there is formed an lower communication window 219 of circular shape that passes through the base wall of the center recess 44.

During installation of the moveable rubber film 74 in the housing space 62, the clinching projection 218 will be passed through the insertion hole 86 which has been formed in the plate spring 78. The clinching projection 218 will then be subjected to outside force in the axial direction so as to deform the distal end section of the clinching projection 218 that projects up through the plate spring 78 and make it larger in diameter than the inside diameter of the insertion hole 86. By so doing, the center section of the plate spring 78 lying exposed to the outside will be retained by the clinching projection 218, thereby fastening the center section of the moveable rubber film 74 to the partition member 212. In the above manner, the diametrical center section of the moveable rubber film 74 may be fastened to the partition member 212 by clinching.

Figure 30:
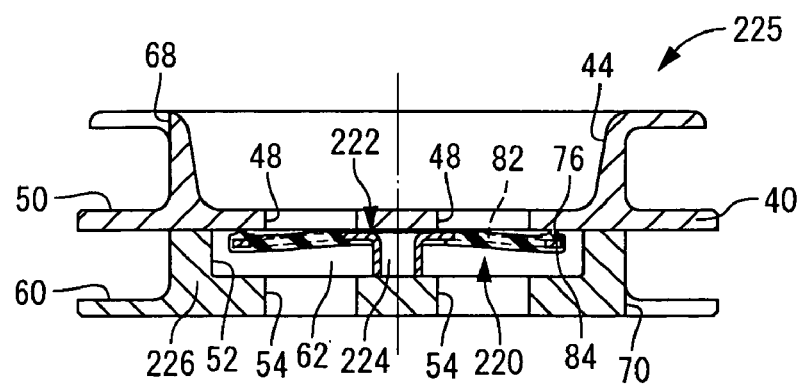
FIG. 30 is a partition member of another arrangement employed in the present invention.

Fastening means could also be provided on the obstructing rubber elastic plate side. As a specific example, it would be possible to employ a structure like that of the moveable rubber film 220 depicted in FIG. 30. Specifically, in the moveable rubber film 220 there is integrally formed a clasp-retained portion 224 of generally round tubular shape extending in the axial direction in the center section of a plate spring 222. The lower end face of the clasp-retained portion 224 is pressed against the lower wall face of the housing space 62, while the center upper end face of the moveable rubber film 220 is pressed against the upper wall face of the housing space 62, thereby fastening the center section of the moveable rubber film 220 with respect to the partition member 38. In this mode, the moveable rubber film 220 is disposed housed within a housing space 62 of a partition member 225. The partition member 225 has a structure in accordance with the lower partition fitting 42 and includes a lower partition fitting 226 having a flat shape of generally unchanging thickness in its center section.

Figure 31:
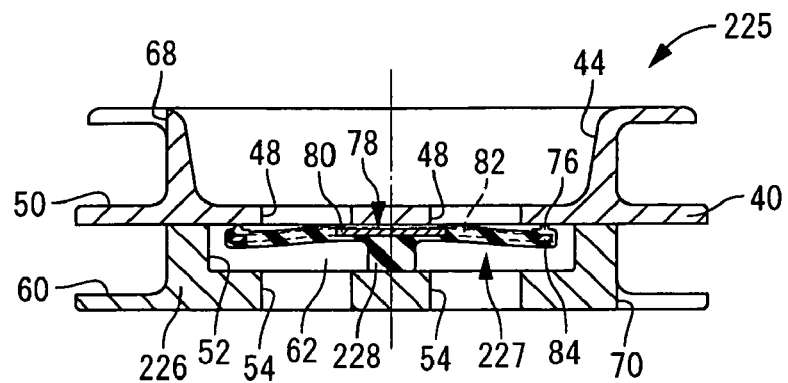
FIG. 31 is a partition member of another arrangement employed in the present invention.

Furthermore, the fastening means provided on the obstructing rubber elastic plate side could be formed by a rubber elastic body, for example. Specifically, in an obstructing rubber elastic plate constituted by a moveable rubber film 227 as depicted in FIG. 31, a clasped rubber elastic body 228 of circular block shape that projects downward and that is anchored to the lower face of the central constraining portion 80 of the plate spring 78 will be integrally formed with the rubber elastic body that constitutes the moveable rubber film 227. The lower end face of the clasped rubber elastic body 228 is pressed against the lower wall face of the housing space 62, while the center upper end face of the moveable rubber film 227 is pressed against the upper wall face of the housing space 62, thereby fastening the center section of the moveable rubber film 227 with respect to the partition member 38. In this embodiment, the diametrical center section of the moveable rubber film 227 is clasped somewhat elastically with respect to the partition member 38.

Figure 32:
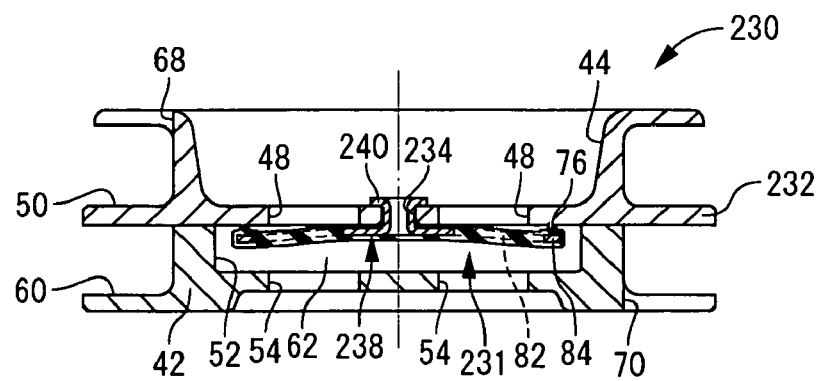
FIG. 32 is a partition member of another arrangement employed in the present invention.

It would also be possible to provide a mating portion to the center section of the obstructing rubber elastic plate, and to then fasten the center portion of the obstructing rubber elastic plate to the partition member through engagement of this mating portion with the partition member. As a specific example, a partition member 230 and a moveable rubber film 231 of structure like those depicted in FIG. 32 could be employed. Specifically, in the partition member 230 there has been made a mating hole 234 that perforates the diametrical center section of an upper partition fitting 232 which is part of the partition member 230. In the moveable rubber film 231, there has been integrally formed a clinching tube portion 240 that projects upward from the diametrical center section of the plate spring 238.

After passing the clinching tube portion 240 through the mating hole 234 that perforates the center portion of the upper partition fitting 232 from the equilibrium chamber 66 side, the distal end of the clinching tube portion 240 will be subjected to external force to induce expansive deformation. The center section of the upper partition fitting 232 will thereby be clamped between the distal end of the clinching tube portion 240 and the center section of the plate spring 238, thus fastening the diametrical center section of the moveable rubber film 231 to the partition member 230.

Figure 33:
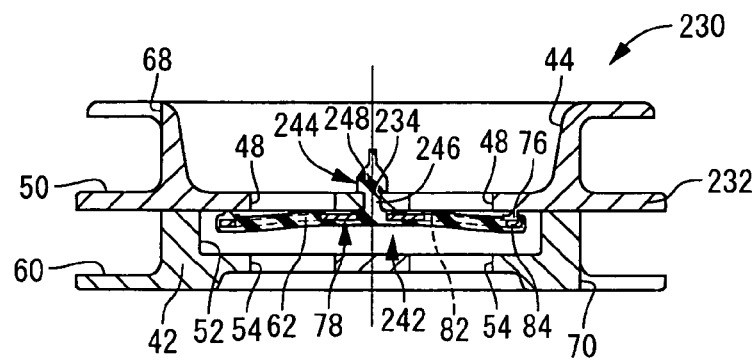
FIG. 33 is a partition member of another arrangement employed in the present invention.

Alternatively, as depicted in FIG. 33, fastening of the moveable rubber film 242 at its center section to the partition member 230 could be accomplished through a design whereby a detent rubber 244 that has been integrally formed with the diametrical center section of the moveable rubber film 242 is passed through and detained in a mating hole 234 that has been formed in the center of the upper partition fitting 232.

In more detail, the detent rubber 244 is of generally rod shape projecting upward from the diametrical center section of the moveable rubber film 242. It has a structure that includes a basal end portion 246 approximately equal in outside diameter to the mating hole 234, and a detent portion 248 integrally formed above the basal end portion 246 and larger in diameter than it. The detent portion 248 gradually decreases in diameter towards its distal end (upward in FIG. 33).

The detent rubber 244 is inserted into the mating hole 234 so that its basal end portion 246 passes through the mating hole 234, and the detent portion 248 projects out to the upper side of the partition member 230 through the mating hole 234. Thereby, the shoulder which has been formed between the basal end portion 246 and the detent portion 248 of the detent rubber 244 will be detained by the partition member 230, thereby fastening the moveable rubber film 242 at its center section to the partition member 230.

Figure 34:
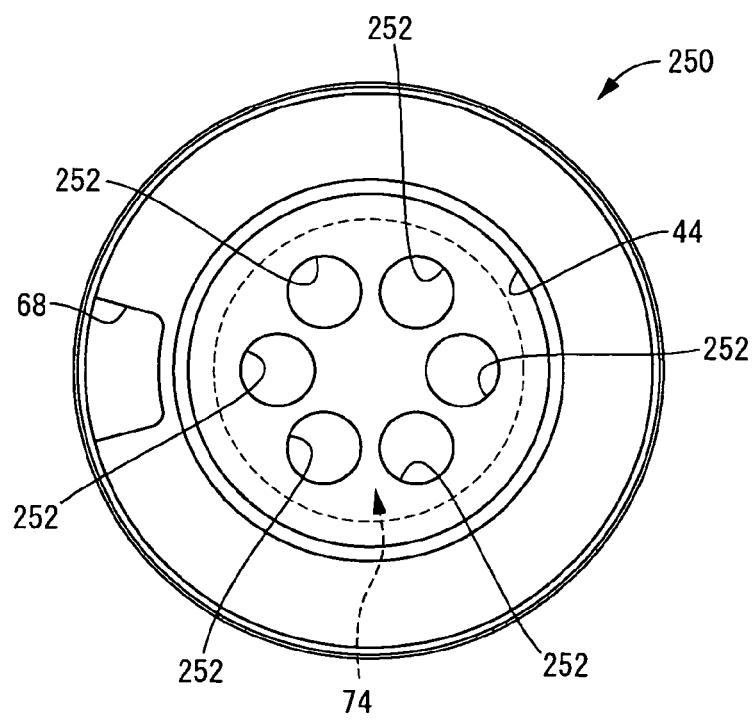
FIG. 34 is a partition member of another arrangement employed in the present invention.

Moreover, the shape of the communication passages (the upper communication windows 48) taught in the first and second embodiments is merely exemplary, and the size, shape etc. of the upper communication windows 48 and the lower communication windows 54 may be set appropriately according to the desired vibration damping characteristics and so on. As a specific example, the sections of the partition member 250 that constitute the upper wall and the lower wall of the housing space 62 could be perforated by a plurality of communication windows 252 having circular cross section, as depicted in FIG. 34.

Furthermore, besides communication windows 48, 54 of generally semicircular cross section split along an axis in the diametrical direction as taught in the first and second embodiments, there could also be employed communication windows of generally fan-shaped cross section with a center angle of 90° split along two mutually perpendicular diametrical axes; communication windows of generally fan-shaped cross section with a center angle of 120° positioned on the circumference; a set of communication windows extending in the circumferential direction and positioned in opposition along a diametrical axis, or the like.

The reinforcing member provided to the obstructing rubber elastic plate can also be realized through a member that is a rigid body, having generally identical shape and size to the plate spring 78 taught in the first embodiment. In a obstructing rubber elastic plate having a reinforcing member that is a rigid body substantially incapable of deformation, the outer peripheral section of the obstructing rubber elastic plate will be retained in a more stable state of contact against the partition member 38. Consequently, at times of input of ordinary vibration, there will be effectively attained vibration damping effect based on fluid flow through the orifice passage 72.

Moreover, by giving the reinforcing member radial spoke-shaped spring portions 82, the sections that experience deformation due to positive pressure of the pressure receiving chamber 64 will be limited to those sections composed of the rubber elastic body only, which have progressively smaller free length in the circumferential direction moving towards the inner peripheral side. Consequently, it will be possible to adjust the aperture area of the short-circuit passage 73 with high accuracy depending on the magnitude of positive pressure acting on the obstructing rubber elastic plate so as to more effectively obtain vibration damping effect which can be exhibited over a wider frequency range through automatic adjustments of the tuning of the orifice passage 72.

Where the reinforcing member is a rigid body, the reinforcing member may differ in shape and size from the plate spring 78 that was taught in the first embodiment, and the member may be designed appropriately depending on the desired vibration damping capabilities and so on.

In the first embodiment depicted in FIGS. 1 to 6, the plate spring 78 was fastened at its center section to the partition member 38, and uniform elastic deformation of each of the spoke-shaped spring portions 82 was allowed. However, the mode of fastening of the plate spring 78 to the partition member 38, inclusive of the fastening location and the fastening structure, is not limited thereby. For example, the plate spring 78 could be fastened to the partition member 38 at two points on a pair of rim portion 84, 84 that are situated in opposition in the diametrical direction on the plate spring 78; or the plate spring could be provided with four spoke-shaped spring portions formed at equal intervals in the circumferential direction, and pairs of these spoke-shaped spring portions situated in opposition in the diametrical direction fastened respectively at their diametrical distal end sections to the partition member. By fastening the plate spring to the partition member at one or several locations on the partition member in this way, in a state such the plate spring is permitted to elastically deform, it will be possible for elastic deformation of the moveable rubber film 74 to take place with two different spring characteristics, i.e. characteristics in a low-pressure action state based on elastic deformation of the rubber only, and characteristics in a high-pressure action state with concomitant elastic deformation of the plate spring, and to thereby effective achieve working effects comparable to those of the plate spring 78 fastened at its center section of the partition member 38 as taught in the first embodiment.

The present invention is not limited to engine mounts only, and is adaptable to implementation in various kinds of fluid filled type vibration damping devices such as suspension mounts or body mounts.

Nor it is the present invention necessarily limited to fluid filled type vibration damping devices for automotive use, and may be implemented advantageously in fluid filled type vibration damping devices for train cars, or in switchable fluid filled type vibration damping devices for any of various other applications.

It is also to be understood that the present invention may be embodied with various other changes, modifications and improvements, which may occur to those skilled in the art, without departing from the spirit and scope of the invention defined in the following claims.

What is claimed is:

1. A fluid filled vibration damping device comprising:
   a rubber elastic body elastically connecting a first mounting member and a second mounting member;
   a partition member supported on the second mounting member;
   a pressure receiving chamber whose wall is partly defined by the rubber elastic body;
   an equilibrium chamber whose wall is partly defined by a flexible film;
   the pressure receiving chamber and the equilibrium chamber being filled with a non-compressible fluid, and the pressure receiving chamber and the equilibrium chamber communicating with each other through an orifice passage,
   the partition member that partitions the pressure receiving chamber and the equilibrium chamber being provided with a communication passage that connects the pressure receiving chamber and the equilibrium chamber;
   an obstructing rubber elastic plate being juxtaposed against the communication passage from an equilibrium chamber side, being adapted to obstruct the communication passage, and being arranged such that pressure of the pressure receiving chamber acts upon a first face of the obstructing rubber elastic plate while pressure of the equilibrium chamber acts on another face thereof; and
   a constraining member being provided for retaining an outer peripheral section of the obstructing rubber elastic plate in a state of localized contact against the partition member at multiple locations on a circumference,
   wherein the constraining member provides an opening/closing control member such that positive pressure of the pressure receiving chamber acting on the obstructing rubber elastic plate induces zones situated in an outer peripheral section of the obstructing rubber elastic plate but away from retained sections by the constraining member to undergo elastic deformation in a direction of separation from the partition member, and open up the communication passage, and
   wherein the constraining member is constituted by a reinforcing member that is made of a plate spring and provided within the obstructing rubber elastic plate, and that has a plurality of spoke portions extending radially towards the outer peripheral section from a center section of the obstructing rubber elastic plate while having split rim portions that extend in a circumferential direction at the outer peripheral section of the obstructing rubber elastic plate, which are integrally provided at outside peripheral distal end sections of the spoke portions while being spaced away from one another in the circumferential direction,
   wherein at the outer peripheral section of the obstructing rubber elastic plate, the retained sections provided with the split rim portions of the plate spring are pressed and retained on the partition member by means of an urging force of the plate spring, and the urging force acting on the outer peripheral section of the obstructing rubber elastic plate in the retained sections is set at a higher level than an urging force acting on zones away from the retained sections in the outer peripheral section of the obstructing rubber elastic plate, so that the retained sections undergo elastic deformation in the direction of separation from the partition member through action of a positive pressure greater than a positive pressure of the pressure receiving chamber inducing elastic deformation in zones away from the retained sections, causing the communication passage to open up.

2. The fluid filled vibration damping device according to claim 1, wherein the obstructing rubber elastic plate is fastened at the center section thereof to the partition member.

3. The fluid filled vibration damping device according to claim 1, wherein the reinforcing member is a rigid body.

* * * * *